(12) United States Patent
Ko

(10) Patent No.: US 12,436,724 B2
(45) Date of Patent: Oct. 7, 2025

(54) ELECTRONIC DEVICE, METHOD, NON-TRANSITORY COMPUTER-READABLE STORAGE MEDIUM FOR DISPLAYING WINDOW TO GUIDE SCREEN CHANGE IN RESPONSE TO SIZE CHANGE OF DISPLAY AREA OF FLEXIBLE DISPLAY

(71) Applicant: Samsung Electronics Co., Ltd., Suwon-si (KR)

(72) Inventor: Juhyun Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/763,480

(22) Filed: Jul. 3, 2024

(65) Prior Publication Data

US 2024/0361967 A1 Oct. 31, 2024

Related U.S. Application Data

(63) Continuation of application No. PCT/KR2022/021328, filed on Dec. 26, 2022.

(30) Foreign Application Priority Data

Apr. 19, 2022 (KR) .......................... 10-2022-0048545
Jul. 1, 2022 (KR) .......................... 10-2022-0081523

(51) Int. Cl.
*G09G 5/00* (2006.01)
*G06F 1/16* (2006.01)
*G06F 3/14* (2006.01)

(52) U.S. Cl.
CPC .............. *G06F 3/14* (2013.01); *G06F 1/1652* (2013.01)

(58) Field of Classification Search
CPC .... G06F 1/1624; G06F 1/1637; G06F 1/1643; G06F 1/1652; G06F 1/1677; G06F 3/048;
(Continued)

(56) References Cited

U.S. PATENT DOCUMENTS 9,041,648 B2 5/2015 Lee et al.
9,152,180 B2 10/2015 Kim
(Continued)

FOREIGN PATENT DOCUMENTS

EP 4 187 349 A1 5/2023
JP 2017-142657 A 8/2017
(Continued)

OTHER PUBLICATIONS

European Search Report dated Jul. 16, 2024, issued in European Application No. 22826790.2.
(Continued)

*Primary Examiner* — Joe H Cheng
(74) *Attorney, Agent, or Firm* — Jefferson IP Law, LLP

(57) ABSTRACT

An electronic device according to an embodiment may include: a housing; a flexible display which can be inserted into the housing or drawn out from the housing; a memory configured to store instructions, and a processor operatively connected to the flexible display. The processor may be configured to receive, when the instructions are executed, a predetermined input while a first portion of a screen is displayed in a state in which a display area of the flexible display exposed to the outside of the housing has a first size. The processor may be configured to display, when the instructions are executed, in response to the predetermined input, a window for guiding a position to display a second portion of the screen extending from the first portion of the screen to partially overlap on the first portion of the screen (Continued)

when the size of the display area is changed from the first size to a second size larger than the first size.

20 Claims, 28 Drawing Sheets

(58) Field of Classification Search
CPC .... G06F 3/0481; G06F 3/0485; G06F 3/0488; G06F 3/14; G06F 2203/04102; G06F 2203/04803; G06F 2203/04804; G09F 9/301; H04M 1/0235; H04M 1/0245; H04M 1/0268
See application file for complete search history.

(56) References Cited

U.S. PATENT DOCUMENTS

| | | | |
|---|---|---|---|
| 11,057,514 | B1 | 7/2021 | Noh et al. |
| 11,106,245 | B2 | 8/2021 | Shim et al. |
| 11,252,826 | B2* | 2/2022 | Park .................... G06F 3/04886 |
| 11,366,563 | B2 | 6/2022 | Kim et al. |
| 12,032,815 | B2 | 7/2024 | Cheon et al. |
| 2016/0378270 | A1 | 12/2016 | Lee et al. |
| 2017/0011714 | A1 | 1/2017 | Eim et al. |
| 2021/0072796 | A1 | 3/2021 | Kim et al. |
| 2021/0337049 | A1 | 10/2021 | Noh et al. |
| 2022/0113842 | A1 | 4/2022 | Kim et al. |
| 2022/0147196 | A1* | 5/2022 | Kim ..................... G06F 3/041 |
| 2023/0325139 | A1 | 10/2023 | Matsumura et al. |

FOREIGN PATENT DOCUMENTS

| | | | |
|---|---|---|---|
| KR | 10-2014-0135404 | A | 11/2014 |
| KR | 10-2017-0000553 | A | 1/2017 |
| KR | 10-2017-0062121 | A | 6/2017 |
| KR | 10-2047690 | B1 | 11/2019 |
| KR | 10-2256042 | B1 | 5/2021 |
| KR | 10-2022-0008742 | A | 1/2022 |
| WO | 2017/090826 | A1 | 6/2017 |
| WO | 2021/100932 | A1 | 5/2021 |
| WO | 2022/025450 | A1 | 2/2022 |
| WO | 2022/049795 | A1 | 3/2022 |

OTHER PUBLICATIONS

International Search Report dated Apr. 4, 2023, issued in International Application No. PCT/KR2022/021328.
European Office Action dated Jul. 16, 2025, issued in European Application No. 22 826 790.2.

* cited by examiner

ELECTRONIC DEVICE, METHOD, NON-TRANSITORY COMPUTER-READABLE STORAGE MEDIUM FOR DISPLAYING WINDOW TO GUIDE SCREEN CHANGE IN RESPONSE TO SIZE CHANGE OF DISPLAY AREA OF FLEXIBLE DISPLAY

CROSS-REFERENCE TO RELATED APPLICATION(S)

This application is a continuation application, claiming priority under § 365(c), of an International application No. PCT/KR2022/021328, filed on Dec. 26, 2022, which is based on and claims the benefit of a Korean patent application number 10-2022-0048545, filed on Apr. 19, 2022, in the Korean Intellectual Property Office, and of a Korean patent application number 10-2022-0081523, filed on Jul. 1, 2022, in the Korean Intellectual Property Office, the disclosure of each of which is incorporated by reference herein in its entirety.

BACKGROUND

1. Field

The following descriptions relate to an electronic device, a method, and a non-transitory computer-readable storage medium for displaying a window for guiding a change of a screen according to a change in size of a display region of a flexible display.

2. Description of Related Art

An electronic device including a flexible display such as a rollable display can provide a state in which a part of the flexible display is slidably inserted into a housing of the electronic device and a state in which the part of the flexible display is slidably exposed out of the housing. The electronic device can provide a relatively wider display region while having a relatively more compact structure, by means of utilizing such states.

SUMMARY

According to an embodiment, an electronic device may comprise a housing, a flexible display that is slidable-in into the housing or slidable-out from the housing, a memory configured to store instructions, and a processor operatively coupled to the flexible display. The processor may be configured to, when the instructions are executed, receive a predetermined input, while a first portion of a screen is displayed in a state in which a display region of the flexible display exposed out of the housing has a first size. The processor may be configured to, when the instructions are executed, in response to the predetermined input, display a window for guiding a position where a second portion of the screen extended from the first portion of the screen is to be displayed, when a size of the display region is changed from the first size to a second size larger than the first size, as partially superimposed on the first portion of the screen.

According to an embodiment, a method for operating an electronic device comprising a housing and a flexible display that is slidable-in into the housing or slidable-out from the housing may comprise receiving a predetermined input, while a first portion of a screen is displayed in a state in which a display region of the flexible display exposed out of the housing has a first size. The method may comprise, in response to the predetermined input, displaying a window for guiding a position where a second portion of the screen extended from the first portion of the screen is to be displayed, when a size of the display region is changed from the first size to a second size larger than the first size, partially overlappingly on the first portion of the screen.

According to an embodiment, a non-transitory computer-readable storage medium may store at least one program comprising instructions that, when executed by a processor of an electronic device comprising a housing and a flexible display that is slidable-in into the housing or slidable-out from the housing, cause the electronic device to receive a predetermined input, while a first portion of a screen is displayed in a state in which a display region of the flexible display exposed out of the housing has a first size. The at least one program may comprise instructions that, when executed by the processor of the electronic device, cause the electronic device to, in response to the predetermined input, display a window for guiding a position where a second portion of the screen extended from the first portion of the screen is to be displayed, when a size of the display region is changed from the first size to a second size larger than the first size, partially overlappingly on the first portion of the screen.

According to an embodiment, an electronic device may comprise a housing, a flexible display that is slidable-in into the housing or slidable-out from the housing, a memory configured to store instructions, and a processor operatively coupled to the flexible display. The processor may be configured to, when the instructions are executed, receive a predetermined input, while a screen is displayed in a state in which a display region of the flexible display exposed outside the housing has a first size. The processor may be configured to, when the instructions are executed, in response to the predetermined input, display a window for guiding a portion of the screen of which display is to be ceased when a size of the display region is changed from the first size to a second size smaller than the first size, as superimposed on the portion of the screen.

According to an embodiment, a method for operating an electronic device comprising a housing and a flexible display that is slidable-in into the housing or slidable-out from the housing may comprise receiving a predetermined input, while a screen is displayed in a state in which a display region of the flexible display exposed out of the housing has a first size. The method may comprise, in response to the predetermined input, displaying a window for guiding a portion of the screen of which display is to be ceased when a size of the display region is changed from the first size to a second size smaller than the first size, as superimposed on the portion of the screen.

According to an embodiment, a non-transitory computer-readable storage medium may store at least one program comprising instructions that, when executed by a processor of an electronic device comprising a housing and a flexible display that is slidable-in into the housing or slidable-out from the housing, cause the electronic device to receive a predetermined input, while a screen is displayed in a state in which a display region of the flexible display exposed out of the housing has a first size. The at least one program may comprise instructions that, when executed by the processor of the electronic device, cause the electronic device to, in response to the predetermined input, display a window for guiding a portion of the screen of which display is to be ceased when a size of the display region is changed from the first size to a second size smaller than the first size, as superimposed on the portion of the screen.

DETAILED DESCRIPTION

An electronic device may include a flexible display that is caused to at least partially slide-in into a housing of the electronic device or at least partially slide-out from the housing. A size of a display region of the flexible display exposed out of the housing may vary according to the sliding-in or the sliding-out. For example, the size of the display region may be changed from a first size to a second size, the second size being smaller than the first size, or may be changed from the second size to the first size, according to the sliding-in or the sliding-out. For example, a screen displayed in the display region may vary according to a change in size of the display region. For example, when the size of the display region is changed from the first size to the second size, displaying of a portion of the screen displayed in the display region having the first size may be ceased. For example, when the size of the display region is changed from the second size to the first size, new information may be displayed.

Figure 1:
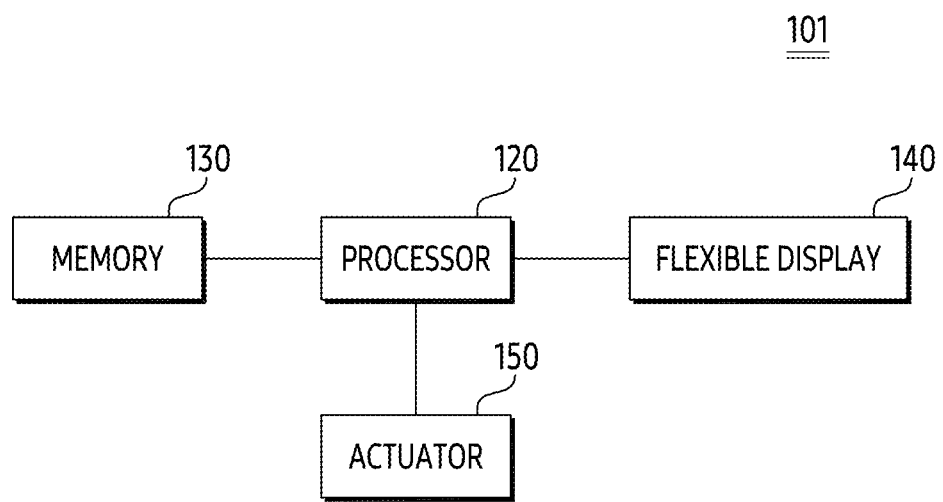
FIG. 1 illustrates exemplary elements of an electronic device.

FIG. 1 illustrates exemplary elements of an electronic device according to an embodiment.

Figure 20A:
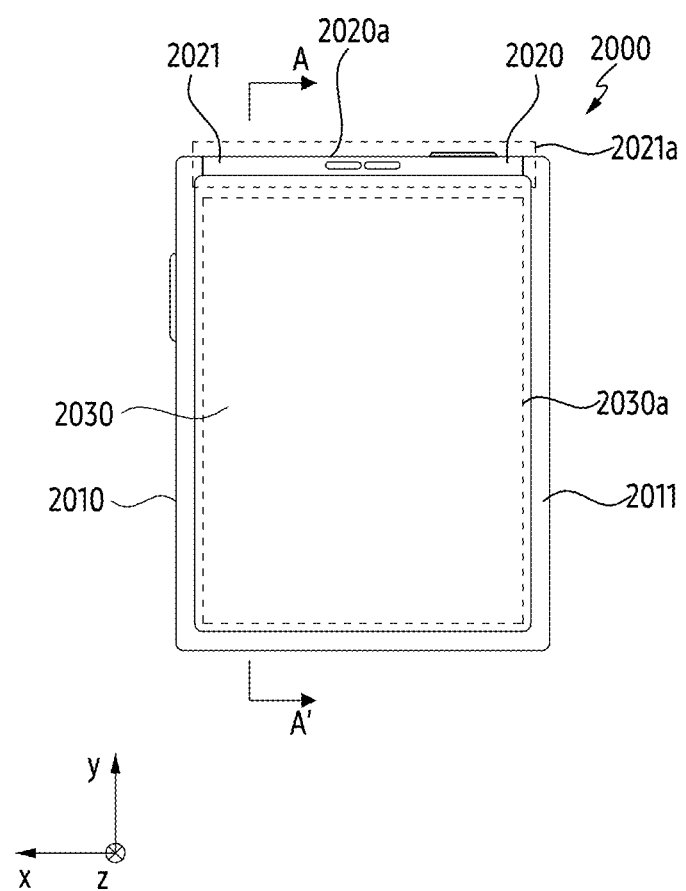
FIG. 20A is a front view of a first state of an electronic device according to an embodiment.
Figure 20B:
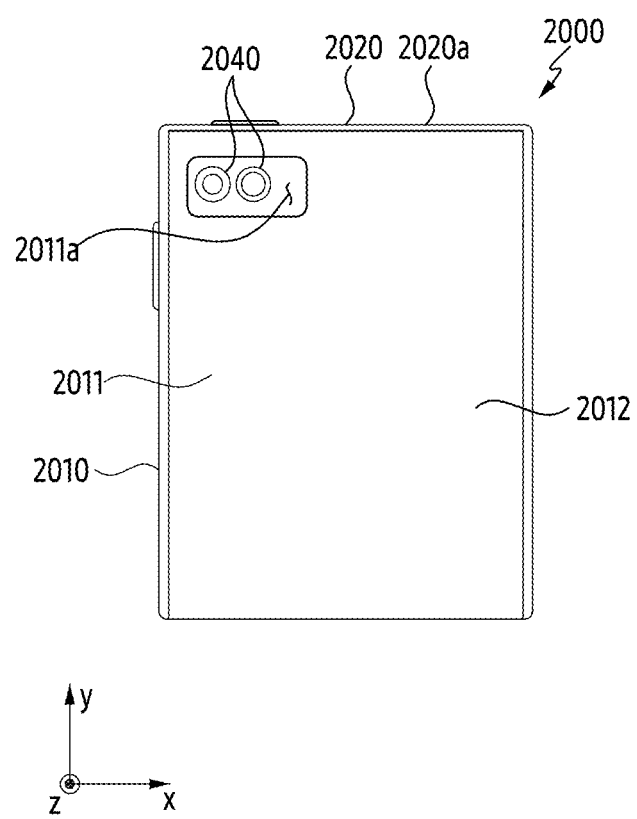
FIG. 20B is a rear view of a first state of an electronic device according to an embodiment.
Figure 20C:
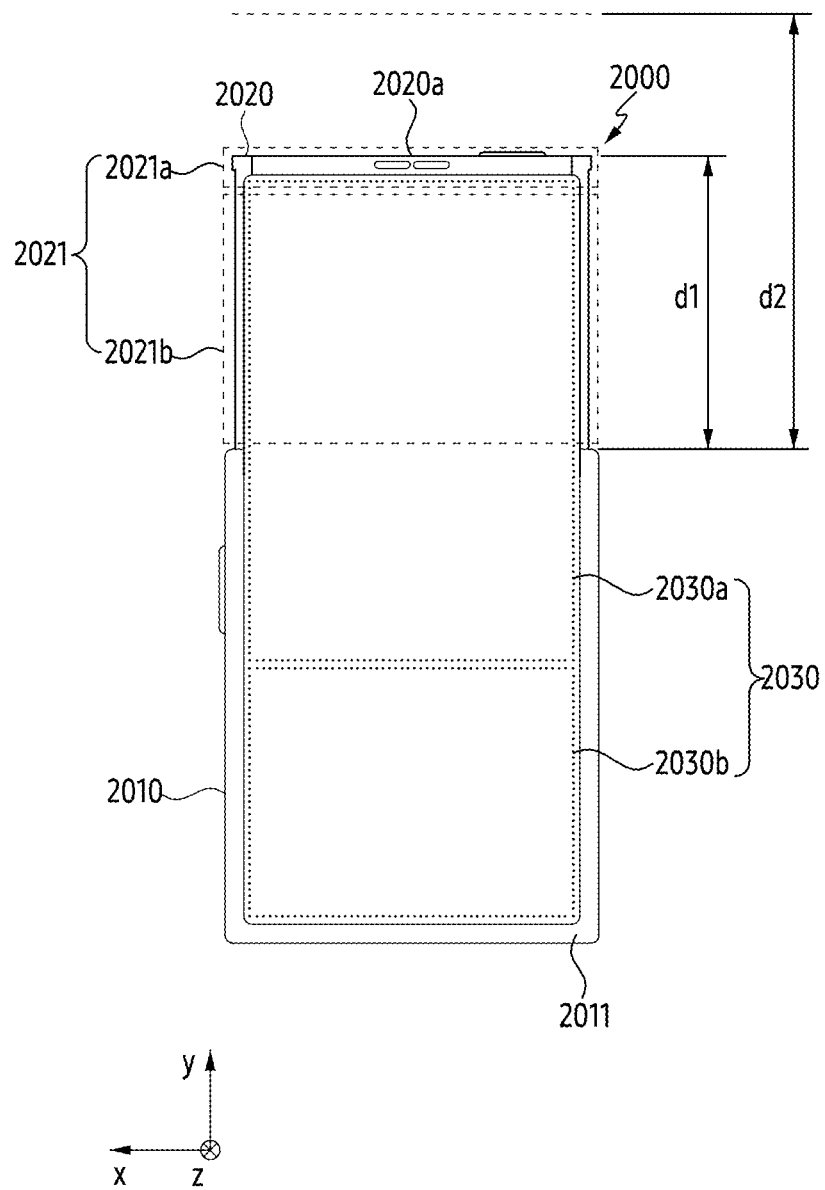
FIG. 20C is a front view of a second state of an electronic device according to an embodiment.
Figure 20D:
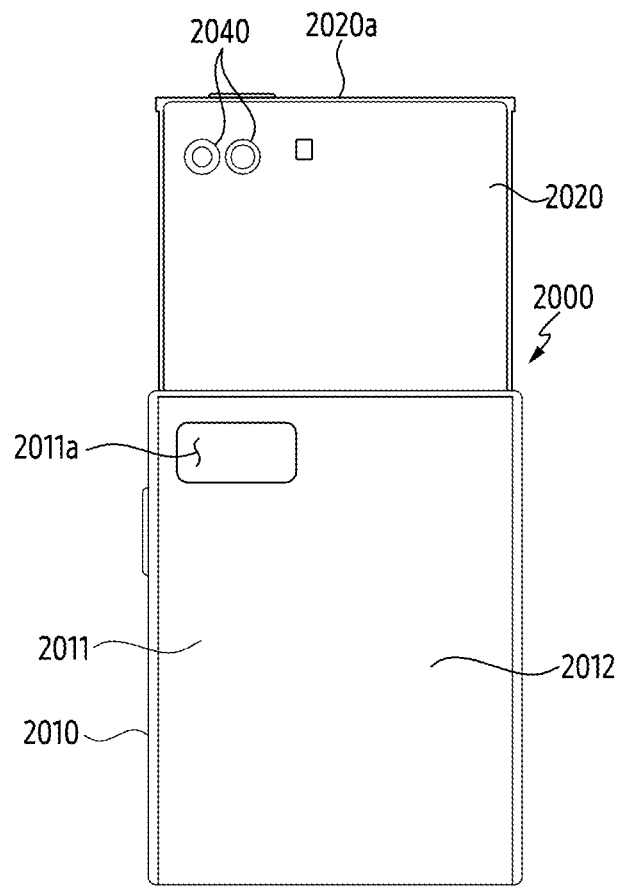
FIG. 20D is a rear view of a second state of an electronic device according to an embodiment.
Figure 21A:
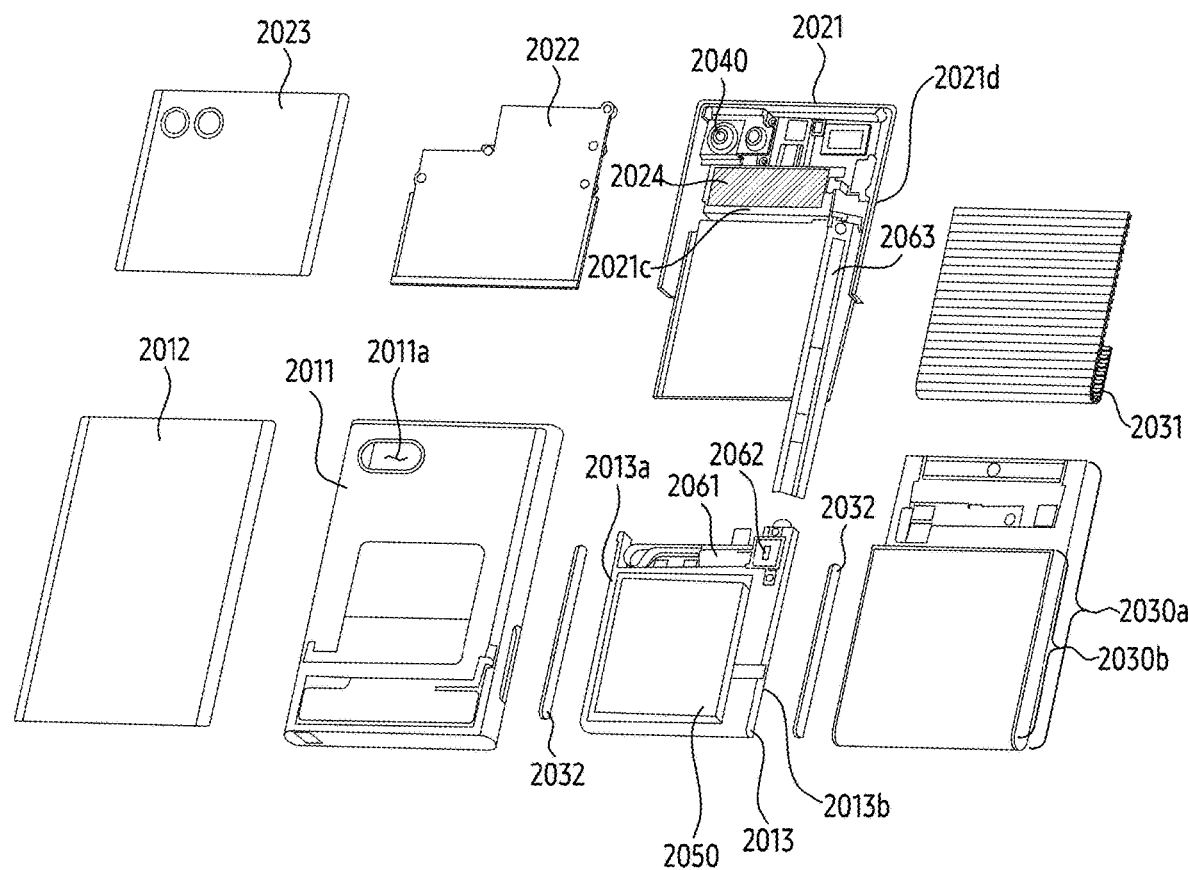
FIG. 21A is an exploded perspective view of an electronic device according to an embodiment.
Figure 21B:
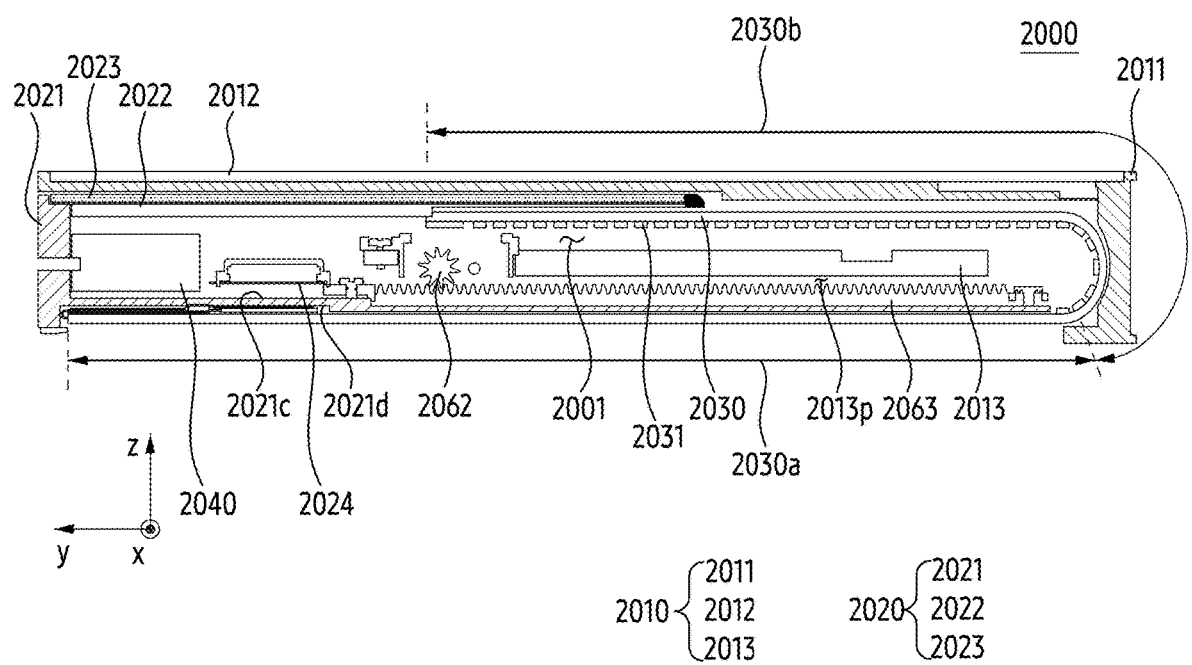
FIG. 21B is a cross-sectional view illustrating an example of an electronic device according to an embodiment taken along a line A-A' of FIG. 20A.

Referring to FIG. 1, the electronic device 101 may be implemented with an electronic device 2000 illustrated in FIGS. 20A to 20D and the electronic device 2000 illustrated in FIGS. 21A and 21B.

The electronic device 101 may include a processor 120, a memory 130, and a flexible display 140. In an embodiment, the electronic device 101 may further include an actuator 150.

For example, the processor 120 may be operatively coupled with the memory 130, the flexible display 140, and/or the actuator 150.

For example, the memory 130 may store one or more programs (or one or more software applications) including instructions. For example, the instructions may be provided to execute at least some of the operations illustrated with reference to FIGS. 3 to 19.

For example, the flexible display 140 may change a display state of a display region of the flexible display 140 based on the control of the processor 120.

For example, the actuator 150 may include a driving unit 2060 illustrated in FIGS. 21A and 21B. For example, the actuator 150 may insert at least a portion of the flexible display 140 into the housing of the electronic device 101 or draw out at least a portion of the flexible display 140 from the housing, based on the control of the processor 120.

For example, the flexible display 140 may be at least partially inserted into the housing of the electronic device 101 through the actuator 150. For example, the flexible display 140 may be a display that is rollable at least partially into the housing. The flexible display 140 may be at least partially pull-out from the housing through the actuator 150. For example, the flexible display 140 may be at least partially exposed out of the housing. For example, the flexible display 140 may include a display region at least partially exposed out of the housing. For example, the flexible display 140 may provide a plurality of states according to the pull-in into the housing or the pull-out from the housing. For example, the size of the display region may be different from each other in each of the plurality of states.

Figure 2:
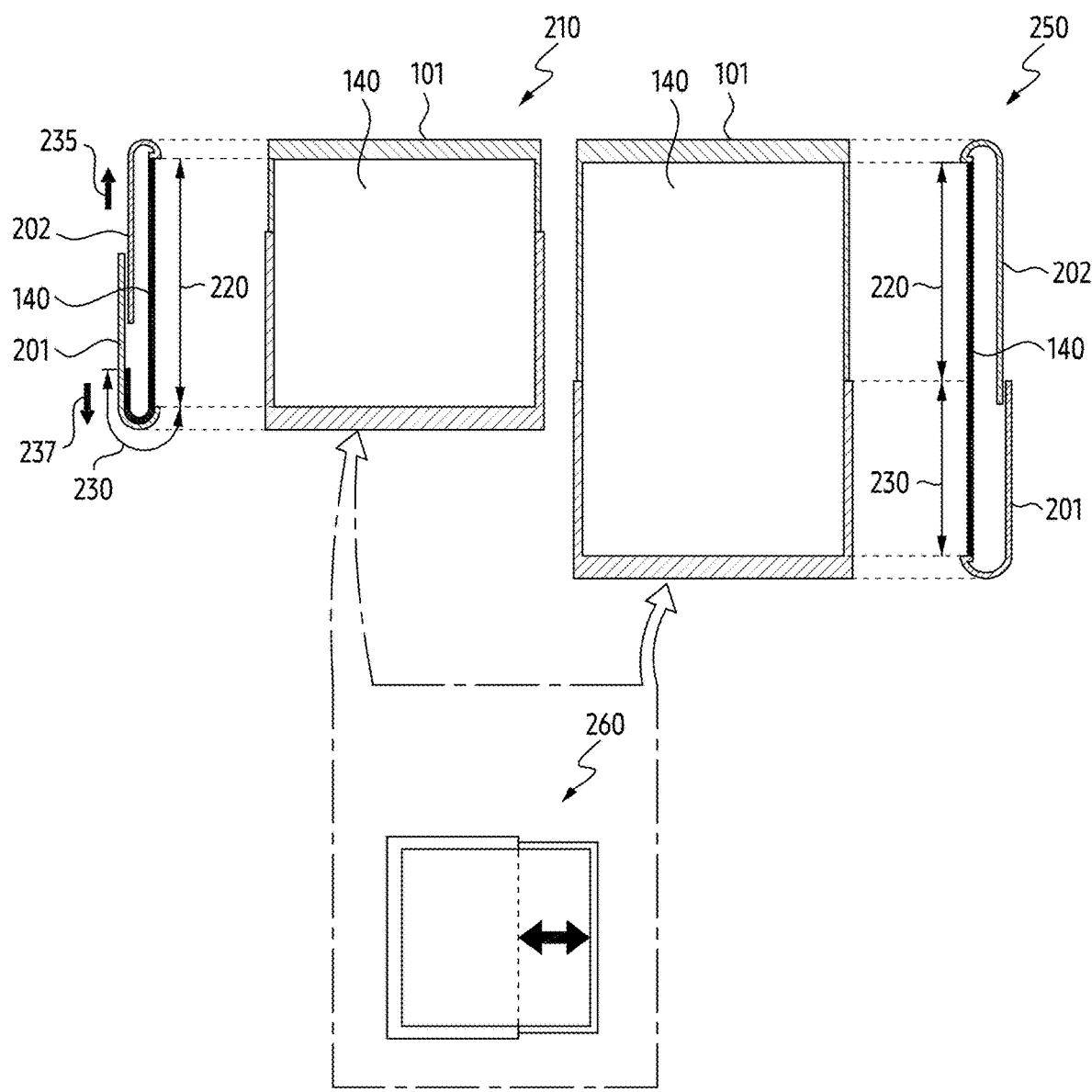
FIG. 2 illustrates an example of a change in size of a display region of a flexible display of an electronic device.

For example, the plurality of states provided by the flexible display 140 may be illustrated with reference to FIG. 2. FIG. 2 illustrates an example of a change in area of the display region of a display of an electronic device according to an embodiment.

Referring to FIG. 2, the flexible display 140 may provide, as one state of the plurality of states, a first state in which a portion of the flexible display 140 is exposed to the outside and the other portion of the flexible display 140 is inserted into a first housing 201 from among the first housing 201 and a second housing 202. In an embodiment, the first state 210 may be a state in which a minimum area (or size) of viewable area is provided. In an embodiment, the first state 210 may be a state in which the flexible display 140 provides a minimum area of display region. In the first state 210, the minimum area of display region may be referred to as a first area 220. In the first state 210, an area of the flexible display 140 that is inserted into the first housing 201 may be referred to as a second area 230. In the first state 210, the first area 220 may be a viewable area. In the first state 210, the first area 220 may be an area exposed out of the first housing 201. In the first state 210, the second area 230 may be a non-viewable area with insertion into the first housing 201. In the first state 210, the second area 230 may be an area covered with the first housing 201 by being inserted into the first housing 201. For convenience of explanation, the present disclosure assumes that the first housing 201 and the second housing 202 are formed of an opaque material so that when the second area 230 is inserted into the first housing 201, it is not viewable from the outside. However, this is only of an example, and at least a portion of the first housing 201 and/or the second housing 202 may be formed of a transparent material. In such a case, even when the second area 230 is inserted into the first housing 201, at least a portion of the second area 230 may be viewable through the first housing 201.

The flexible display 140 may provide, as another state of the plurality of states, a second state 250 in which the flexible display 140 is maximally exposed to the outside. In an embodiment, the second state 250 may be a state in which the flexible display 140 provides a viewable area having a maximum area (or size). The second state 250 may be a state in which the flexible display 140 provides a display region having a maximum area. In the second state 250, the first area 220 and the second area 230 may be viewable regions. In the second state 250, the first area 220 and the second area 230 may be regions exposed out of the first housing 201.

Although not shown in FIG. 2, the flexible display 140 may provide an intermediate state between the first state 210 and the second state 250. The intermediate state may mean a state in which the first area 220 and a portion of the second area 230 are exposed and the remaining portion of the second area 230 is inserted into the first housing 201. In the intermediate state, the first area 220 and a portion of the second area 230 may be viewable regions. In the intermediate state, the first area 220 and the portion of the second area 230 may be regions exposed outside the first housing 201. In the intermediate state, the remaining portion of the second area 230 may be a non-viewable region by insertion into the first housing 201. In the intermediate state, the remaining portion of the second area 230 may be a display region that is covered with the first housing 201 by insertion into the first housing 201.

FIG. 2 illustrates an example in which the second housing 202 is moved or slid in a first direction 235 for switching from the first state 210 to the second state 250, but this is merely for convenience of explanation. For example, depending on the implementation or design of the electronic device 101, the first housing 201 may move or slide in a second direction 237 opposite to the first direction 235, for switching from the state 210 to the state 250.

In the meantime, a direction that the display region is extended when changing from the first state 210 to the second state 250, and a direction that the display region is reduced when changing from the second state 250 to the first state 210 may vary depending on the type of the electronic device 101. For example, the electronic device 101 may be implemented as the electronic device 260 including the flexible display 140 providing a display region, wherein the display region is extended in a first horizontal direction or reduced in a second horizontal direction opposite to the first horizontal direction in a portrait mode. However, the disclosure is not limited thereto.

Figure 3:
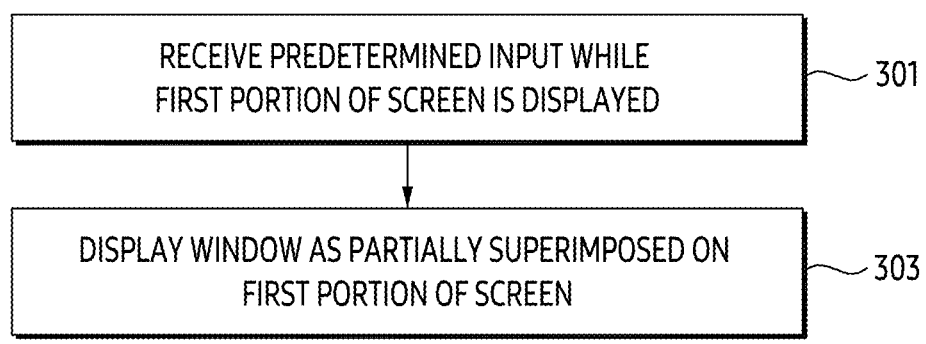
FIG. 3 illustrates an exemplary method of displaying a window for guiding a position where a second portion of a screen extended from a first portion of the screen is to be displayed.

FIG. 3 illustrates an exemplary method of displaying a window for guiding a position where a second portion of the screen extended from a first portion of the screen is to be displayed. This method may be executed by the electronic device 101 or the processor 120 of the electronic device 101 illustrated in FIG. 1.

Figure 4:
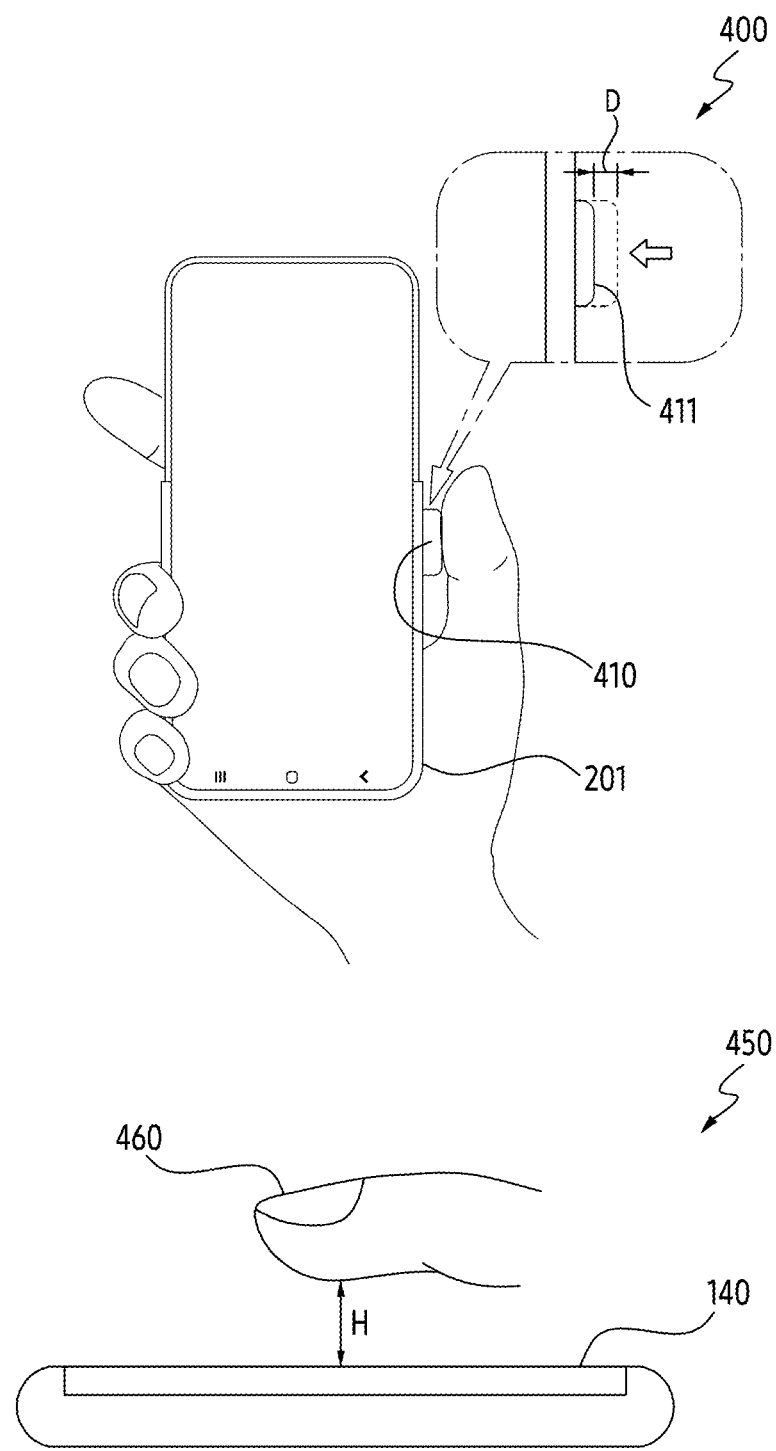
FIG. 4 illustrates an example of a predetermined input.

FIG. 4 illustrates an example of a predetermined input.

Figure 5:
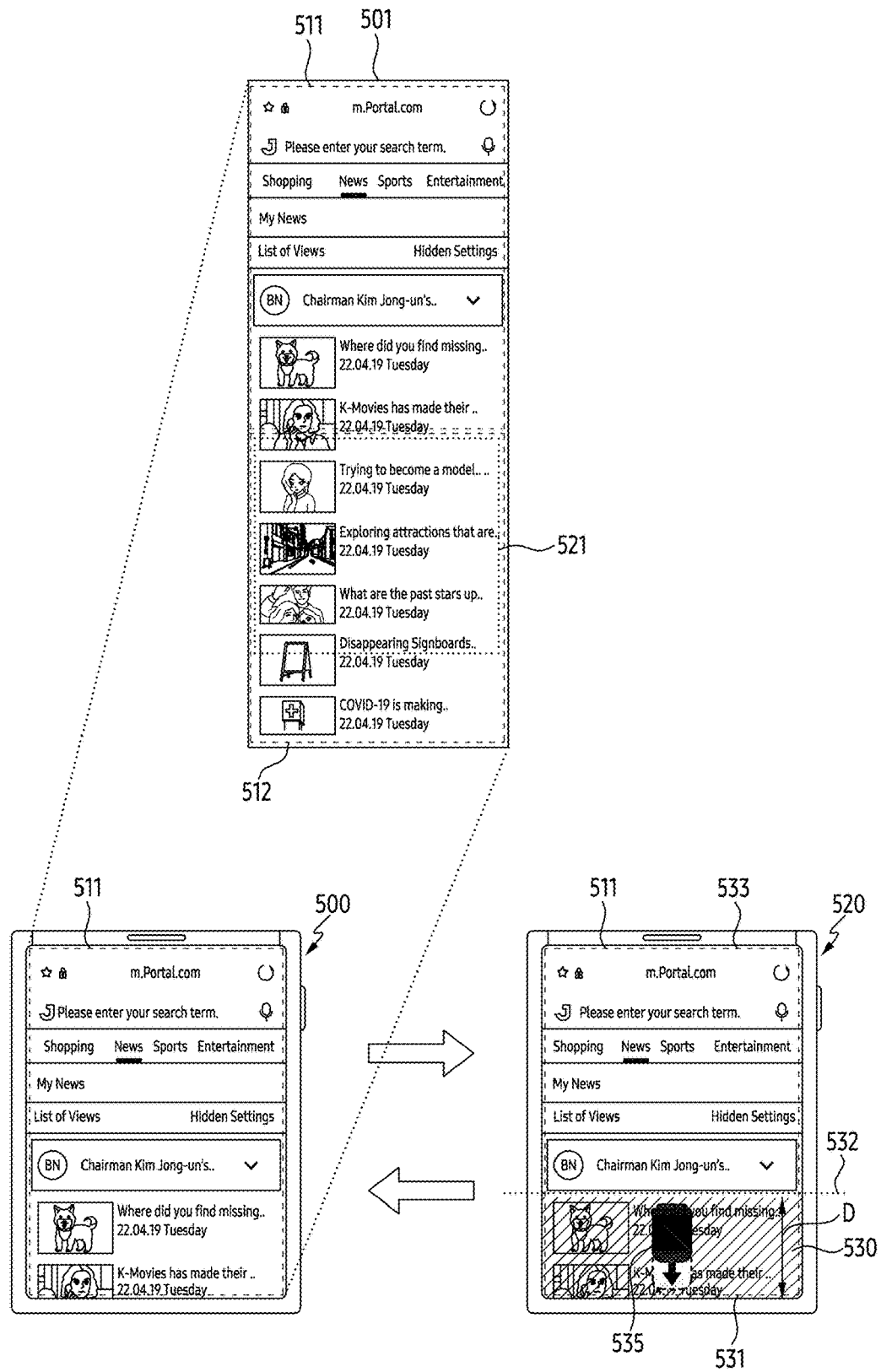
FIG. 5 illustrates an example of a window for guiding a position where a second portion of the screen extended from a first portion of the screen is to be displayed.

FIG. 5 illustrates an example of a window for guiding a position where the second portion of the screen extended from the first portion of the screen is to be displayed.

Referring to FIG. 3, in operation 301, the processor 120 may receive a predetermined input, while a first portion of the screen is displayed in a state that the display region of the flexible display 140, exposed out of the housing (e.g., the first housing 201) of the electronic device 101 has a first size.

For example, the first size may refer to a size of the display region before the display region is changed. For example, the first size may refer to a size of the display region prior to operation 603, which will be illustrated through the description of FIG. 6. For example, the first size in operation 301 may be provided in a state that the display region can be extended. For example, the first size in operation 301 may be provided in the first state 210 illustrated through the description of FIG. 2. For example, the first size in operation 301 may be provided in an intermediate state between the first state 210 and the second state 250 illustrated through the description of FIG. 2. However, the disclosure is not limited thereto.

For example, the screen may have a size larger than the first size of the display region. For example, since the size of the screen is larger than the first size, the processor 120 may, while the electronic device 101 provides the display region having the first size, display the first size of the screen, and may not display the remaining portion of the screen extended from the first portion of the screen in the display region having the first size. For example, while the first portion of the screen is displayed in operation 301, the remaining portion of the screen may not be displayed in the display region. For example, the remaining portion of the screen may be displayed at least partially in response to scrolling of the screen. For example, when the remaining portion of the screen is at least partially displayed in response to the scrolling of the screen, the display of the first portion of the screen is at least partially ceased, in response to the scrolling of the screen. For example, the scrolling of the screen may be caused in response to a touch input (e.g., a swipe input or a sweeping input) released after a contact point on the display region is moved. However, the disclosure is not limited thereto.

Although the following descriptions illustrate that the screen has a size larger than the first size of the display region, according to embodiments, the screen may be smaller than the first size of the display region or may correspond to the first size. For example, the screen may be displayed in a state that does not require any scrolling. However, the disclosure is not limited thereto.

For example, the predetermined input may be an input to trigger execution of operation 303 to be illustrated below. For example, the predetermined input may be an input defined to notify the electronic device 101 that the size of the display region is to be changed. For example, the predetermined input may be an input defined to notify the electronic device 101 that the size of the display region may be changed. For example, the predetermined input may be different from the user input received in operation 601 to be illustrated later through the description of FIG. 6. For example, the properties of the predetermined input may be different from the properties of the user input. For example, the pattern of the predetermined input may be different from the pattern of the user input. For example, an input means for the predetermined input may be different from an input means for the user input. The difference between the predetermined input and the user input will be illustrated with the description of FIG. 6. According to embodiments, the predetermined input may be defined as an input for changing the size of the display region, unlike the above-described example. However, the disclosure is not limited thereto.

For example, the predetermined input may be defined as an input to a physical button exposed through a part of the housing of the electronic device 101 (e.g., the first housing 201 of FIG. 2), or may be defined as a hovering input for the display region. For example, referring to FIG. 4, the predetermined input may be defined as an input to a physical button 410 exposed through a part of the first housing 201, as in the state 400. For example, the predetermined input may be an input by which one end 411 of the physical button 410 is moved by a certain distance. For example, the predetermined input may be an input of pressing the physical button 410 so that one end 411 of the physical button 410 is moved by a distance D. For example, the distance D may be a value between a first reference distance and a second reference distance. For example, the first reference distance may refer to a reference distance defined for identifying that the physical button 410 is pressed, and the second reference distance may refer to a reference distance defined to distinguish the predetermined input from the user input received in operation 601 to be illustrated through the description of FIG. 6. However, the disclosure is not limited thereto. For example, the predetermined input may be defined, such as an input received for a camera to lock focus or exposure. However, the disclosure is not limited thereto.

For example, the predetermined input may be an input that repeats pressing and releasing of the physical button N times (N is a natural number greater than or equal to 1), or an input of pressing the physical button for a predetermined time (e.g., for n seconds, wherein 'n' is a real number greater than 0). However, the disclosure is not limited thereto.

For example, the predetermined input may be defined as a hovering input for the display region, as in the state 450. For example, the predetermined input may be an input in which an input means 460 (e.g., a finger) spaced apart from the display region by a certain distance H is maintained for a predetermined time. For example, the predetermined input may be an input maintained for the predetermined time in a state in which the input means 460 is spaced apart from the display region by the distance H. For example, the distance H may be less than a threshold distance. For example, the threshold distance may be a distance defined to identify a hovering input. A value of the threshold distance may be 0.1 cm to 10 cm, in particular 0, 1 cm to 5 cm, particularly preferred 0.1 cm to 2 cm. However, the disclosure is not limited thereto. For example, the predetermined input may be defined as a hovering input received in a predetermined area of the display region. However, the disclosure is not limited thereto.

For example, the predetermined input may be an input in which a contact point is maintained for a predetermined time on the display region. For example, the predetermined input may be an input having a contact point on a predefined area within the display region. For example, the predetermined input may be an input that has a contact point on the display region and presses the display region with an intensity greater than or equal to a predetermined intensity. However, the disclosure is not limited thereto.

The above-described examples of the predetermined input are merely to indicate that they are defined in the electronic device 101 for the execution of operation 303. It should be noted that various types of inputs for the execution of operation 303 may be set as the predetermined input.

Referring back to FIG. 3, in operation 303, based on the predetermined input, the processor 120 may display, when the size of the display region is changed from the first size to a second size that is distinct from the first size (e.g., the second size being either larger than the first size or smaller than the first size), a window for guiding the display of the screen to be changed according to the change in size of the display region, as partially superimposed on the first portion of the screen. For example, based on the predetermined input, when the size of the display region is changed from the first size to the second size larger than the first size, the processor 120 may display a window for guiding a position where the second portion of the screen extended from the first portion of the screen is to be display, as partially superimposed on the first portion of the screen.

For example, the second size may mean the size of the display region after the display region is changed. For example, the second size may mean the size of the display region in operation 603, which will be illustrated through the description of FIG. 6. For example, the second size may mean the size of the display region extended according to the user input in operation 601, which will be illustrated through the description of FIG. 6. For example, the second size may be provided in a state in which the display region can be reduced. For example, the second size may be provided in the second state 250 illustrated through the description of FIG. 2. For example, the second size may be provided in another state distinct from the first state 210 illustrated through the description of FIG. 2. However, the disclosure is not limited thereto.

For example, the second portion of the screen may be a portion of the screen that is not displayed in the display region due to a difference between the size of the screen and the first size. For example, the second portion of the screen may be a portion of the screen that is not displayed in the display region, unlike the first portion of the screen displayed in the display region having the first size. For example, the size of the second portion of the screen may have a size corresponding to a difference between the second size and the first size. For example, the second portion of the screen may be a portion of the screen displayed in a portion of the display region having the second size, being newly exposed outside the housing of the electronic device 101.

For example, referring to FIG. 5, as in the state 500, the processor 120 may display the first portion 511 of the screen 501 within the display region having the first size. For example, the processor 120 may receive the predetermined input while the first portion 511 of the screen 501 is displayed and the remaining portion 512 of the screen 501 is not displayed. The processor 120 may change the state 500 to a state 520 in response to the predetermined input. For example, in the state 520, when the size of the display region is changed from the first size to the second size, the processor 120 may display a window 530 for guiding a position where the second portion 521 of the screen 501 extended from the first portion 511 of the screen 501 is to be displayed, as partially superimposed on the first portion 511 of the screen 501.

For example, for guiding that the second portion 521 of the screen 501 is extended from an edge 351 of the first portion 511 of the screen 501 when the size of the display region is changed to the second size, the window 530 may be superimposed on an area within the first portion 511 of the screen 501 up to an imaginary line 532 spaced from the edge 531 by a distance D. For example, the window 530 may be superimposed on the region (including the edge 531) of the edge 531 and the edge 533 (opposite to the edge 531) of the first portion 511 of the screen 501, in order to guide that the second portion 521 of the screen 501 is extended from the edge 531 of the first portion 511 of the screen 501.

In an embodiment, the size (or distance D) of the window 530 may correspond to a difference between the first size and the second size. For example, when the difference between the first size and the second size is 'A', the size of the window 530 may be 'a', and when the difference between the first size and the second size is 'B', wherein 'B' is larger than 'A', the size of the window 530 may be 'b', wherein 'b' is larger than 'a'. However, the disclosure is not limited thereto. For example, distance D may initially correspond to at least 10 percent, in particular at least 25 percent, of the screen 501 (e.g. of the first portion 511 and/or of the second portion 521). That is, the window 530 may be superimposed in a predetermined size.

In an embodiment, the window 530 may be translucent so that the region within the first portion 511 of the screen 501 is visible. For example, the first portion 511 of the screen 501 may be viewed through the window 530. However, the disclosure is not limited thereto.

In an embodiment, the window 530 may include a visual object 535 for indicating a direction in which the second portion 521 of the screen 501 extends from the first portion 511 of the screen 501. The visual object 535 may be an arrow and/or a slidable bar (e.g. a slidable bar combined with an arrow).

In an embodiment, the window 530 may be displayed while the predetermined input is maintained. In an embodiment, the display of window 530 may be ceased based on releasing of the predetermined input. For example, the display of window 530 may be ceased in response to identifying that the predetermined input is released. For example, the processor 120 may change the state 520 to the state 500 in response to the ceasing of the display of the window 530. For example, the display of the window 530 may cease in response to identifying that a reference time has elapsed from the timing at which the predetermined input was released. The reference time may be 0.1 seconds or more and/or 5 seconds or less, in particular, 0.3 seconds or more and/or 2 seconds or less, particularly preferred 0.5 seconds or more and/or 1 second or less. For example, the processor 120 may change the state 520 to state 500, in response to the ceasing of the display of the window 530. For example, the display of the window 530 may be ceased in response to identifying that the user input is received after the predetermined input is released, which user input will be illustrated through the description of operation 601 of FIG. 6. However, the disclosure is not limited thereto.

In an embodiment, the processor 120, in response to the predetermined input, may display, instead of the window 530, a visual effect (or visual affordance) for guiding a position where the second portion 521 of the screen 501 extended from the first portion 521 of the screen 501 is to be displayed when the size of the display region is changed to the second size. For example, the visual effect may be displayed along the edge 531 of the first portion 511 of the screen 501. For example, the visual effect may be flickering caused to be made along the edge 531 of the first portion 511 of the screen 501. However, the disclosure is not limited thereto.

In an embodiment, in response to the predetermined input, when the size of the display region is changed to the second size, the processor 120 may at least partially change representation of the first portion 511 of the screen 501, instead of the window 530, for guiding the position where the second portion 521 of the screen 501 extended from the first portion 511 of the screen 501 is to be displayed. For example, the processor 120 may at least partially change the representation of the first portion 511 of the screen 501, by changing the color of the region including the edge 531 of the first portion 511 of the screen 501. However, the disclosure is not limited thereto.

In the following descriptions, it will be described that the window 530 is displayed to guide the position where the second portion 521 of the screen 501 is to be displayed, but this is merely for convenience of description. Displaying the window 530 in the following descriptions may be replaced by displaying the visual effect or changing the representation of the first portion 511 of the screen 501.

As described above, by displaying the window 530, the electronic device 101 may guide the position of information to be additionally displayed (e.g., the second size of the screen 501) after the size of the display region is changed to the second size. For example, the electronic device 101 may display the window 530 in the display region having the first size, so that the user can estimate the state of the display region having the second size, before the size of the display region is changed to the second size. For example, since the window 530 partially overlaps on the information (e.g., the first portion 511 of the screen 501) displayed in the display region having the first size, the window 530 may intuitively guide the position of information to be additionally displayed after the size of the display region is changed to the second size. For example, the electronic device 101 can provide an enhanced user experience through the window 530, in relation to a change in size of the display region.

Figure 6:
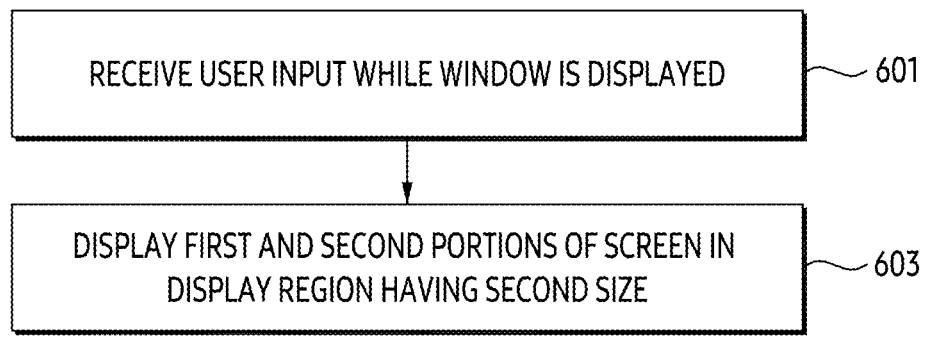
FIG. 6 illustrates an exemplary method of displaying the first portion of the screen and the second portion of the screen.

FIG. 6 illustrates an example method of displaying a first portion of a screen and a second portion of the screen. This method may be executed by the electronic device 101 illustrated in FIG. 1 or the processor 120 of the electronic device 101.

Operations 601 and 603 of FIG. 6 may be included in operation 303 of FIG. 3.

Figure 7:
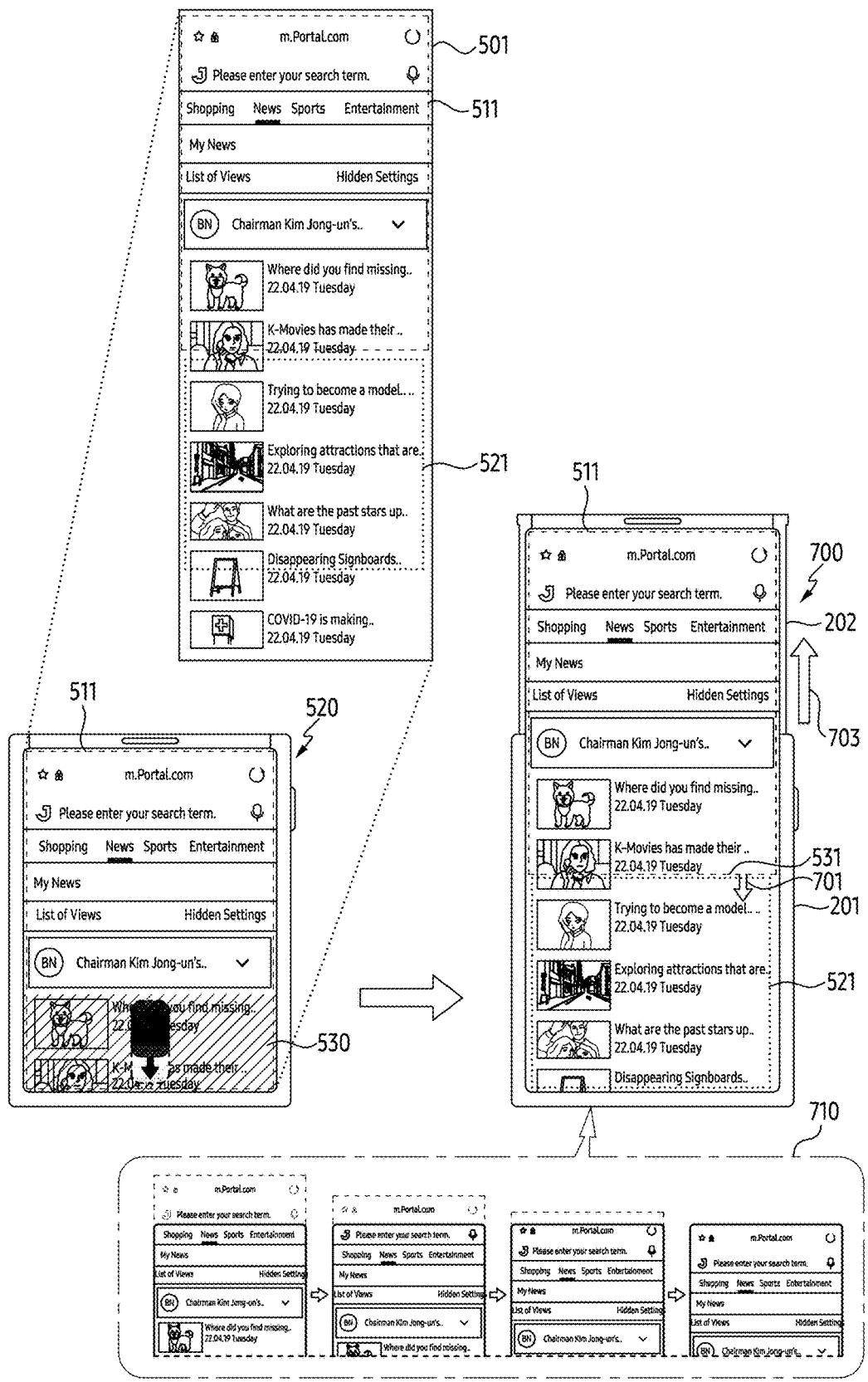
FIG. 7 illustrates an example of the first portion of the screen and the second portion of the screen displayed after a size of the display region is changed.

FIG. 7 illustrates an example of the first portion and the second portion of the screen displayed after changing of the size of the display region.

Referring to FIG. 6, in operation 601, the processor 120 may receive a user input for changing the size of the display region from the first size to the second size, while it is displayed the window for guiding a position where the second portion of the screen extended from the first portion of the screen is to be displayed.

For example, the user input may be an input to trigger changing the size of the display region from the first size to the second size. For example, the user input may be an input for changing the size of the display region to the second size through the actuator 150. For example, the attributes of the user input may be different from the attributes of the predetermined input received in operation 301 of FIG. 3. For example, the pattern of the user input may be different from the pattern of the predetermined input received in operation 301 of FIG. 3. For example, the input means of the user input may be different from the input means of the predetermined input. For example, referring to FIG. 4, when the predetermined input is an input of pressing the physical button 410 so that one end 411 of the physical button 410 is moved by a distance between the first reference distance and the second reference distance, the user input may be an input of pressing the physical button 410 so that one end 411 of the physical button 410 is moved by the second reference distance. For example, in case where the predetermined input is an input the input means 460 spaced apart from the display region by a distance H is maintained for a predetermined time, the user input may be an input of pressing the physical button 410. For example, in case the predetermined input is an input the input means 460 spaced apart from the display region by a distance H is maintained for a predetermined time, the user input may be that the predetermined input is released after the input means 460 spaced apart by the distance H from the display region is maintained for the predetermined time or longer. However, the disclosure is not limited thereto.

In operation 603, the processor 120 may display, in the display region having the second size changed from the first size in response to the user input, the first portion of the screen and the second portion of the screen extended from the first portion of the screen. For example, the processor 120 may change the size of the display region to the second size, by extending the display region through the actuator 150 in response to the user input. For example, the processor 120 may display the first portion of the screen and the second portion of the screen extended from the first portion of the screen, in the display region having the second size. For example, the second portion of the screen may appear from an edge of the first portion of the screen, while the size of the display region is changed from the first size to the second size.

For example, referring to FIG. 7, as in the state 520, the processor 120 may display the window 530 partially superimposed on the first portion 511 of the screen 501, in the display region having one size. For example, in the state 520, the processor 120 may receive the user input while the window 530 is displayed. The processor 120 may change the state 520 to a state 700 in response to the user input. For example, the processor 120 may change the state 520 to the state 700, by changing the size of the display region to the second size based on extending the display region through the actuator 150.

For example, in the state 700, the processor 120 may cease displaying the window 530, and display, in the display region having the second size, the first portion 511 of the screen 501 and the second portion 521 of the screen 501 extended from the first portion 511 of the screen 501. For example, the second portion 521 of the screen 501 may extend in a direction 701 the display region is extended from the edge 531 of the first portion 511 of the screen 501, while the display region is extended.

In an embodiment, when the second size is the size of the display region in the second state 250, the processor 120 may display a visual effect to indicate that the display region is in a state that the display region cannot be extended any more, in response to changing the size of the display region to the second size. For example, the visual effect may a bounce back effect 710 of moving the first portion 511 of the screen 501 and the second portion 521 of the screen 501, which moved in a direction 703 of the second housing 202 being moved with respect to the first housing 201, in a direction (e.g., a direction 701) opposite to the direction 703. However, the disclosure is not limited thereto.

Figure 8:
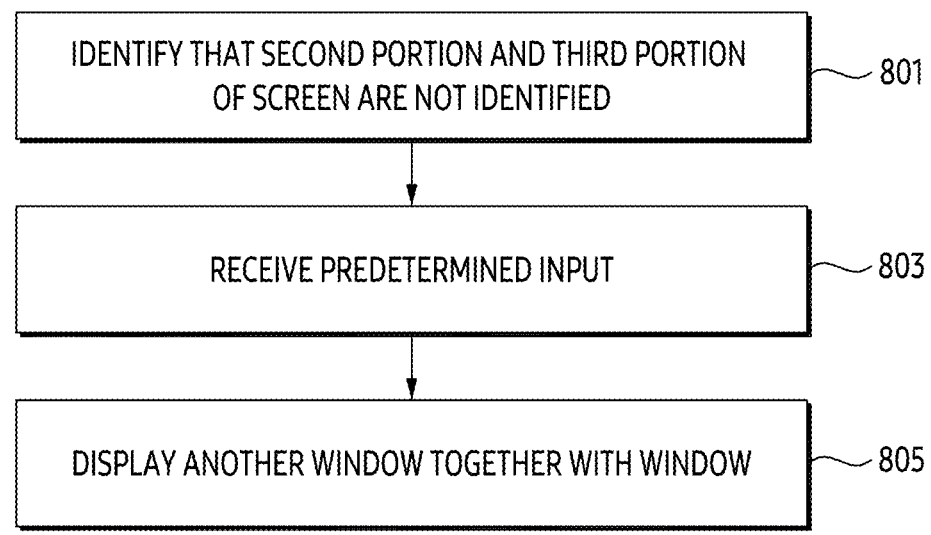
FIG. 8 illustrates an exemplary method of displaying, along with a window for guiding a position at which the second portion of the screen extended from the first portion of the screen is to be displayed, another window for guiding a position at which a third position of the screen extended from the first portion of the screen is to be displayed.

FIG. 8 shows an exemplary method of displaying another window for guiding a window for guiding a position at which a third portion of the screen extended from the first portion of the screen is to be displayed, along with a window for guiding a position at which the second portion of the screen extended from the first portion of the screen is to be displayed. This method may be executed by the electronic device 101 illustrated in FIG. 1 or the processor 120 of the electronic device 101.

Operations 801 to 805 of FIG. 8 may be executed while operations 301 and 303 of FIG. 3 are executed. For example, operations 801 and 803 may be included in operation 301, and operation 805 may be included in operation 303. For example, operation 803 may be included in operation 301, and operations 801 and 805 may be included in operation 303. However, the disclosure is not limited thereto.

Figure 9:
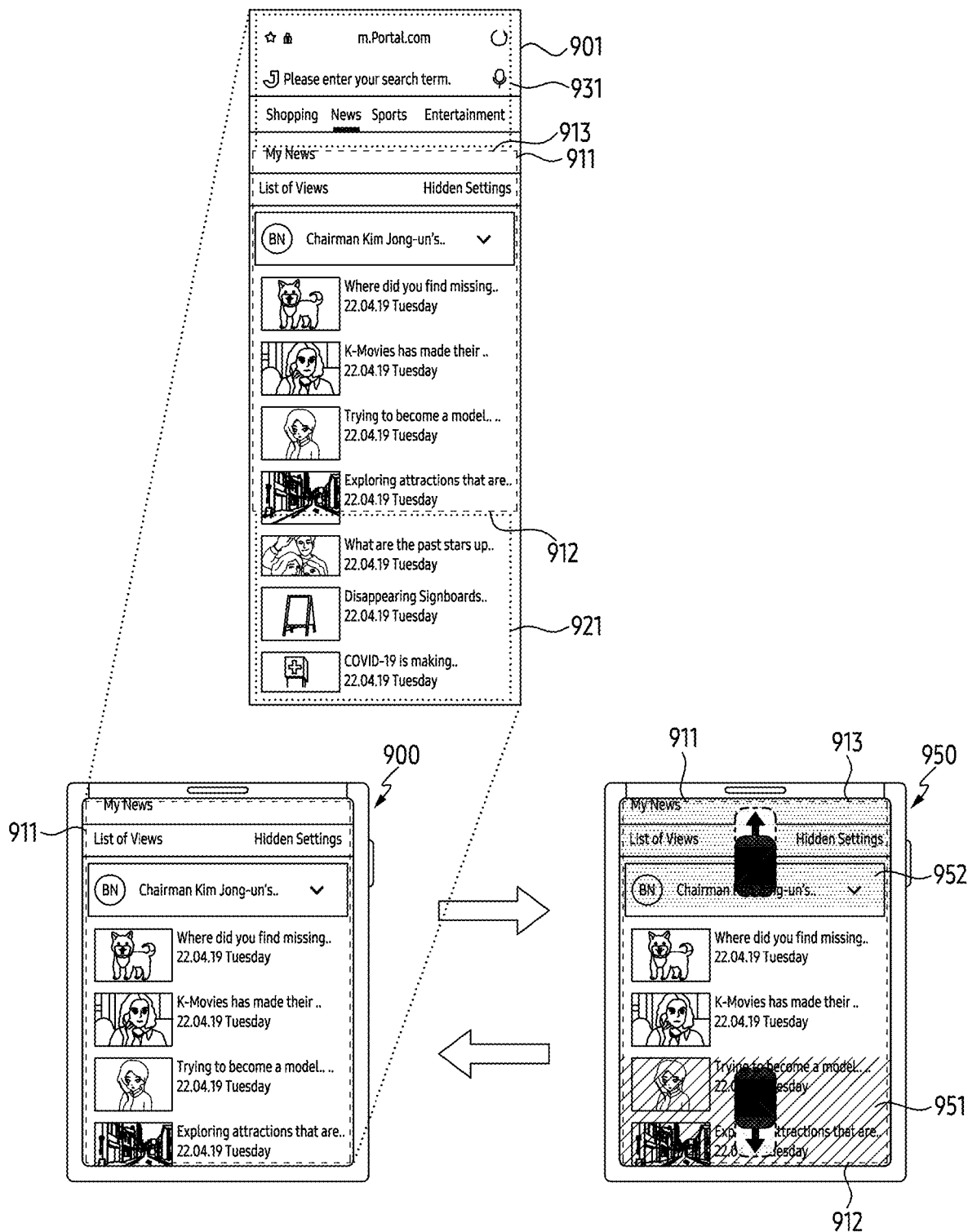
FIG. 9 illustrates an example of another window, which is displayed along with a window for guiding a position at which the second portion of the screen extended from the first portion of the screen is to be displayed, for guiding a position at which a third position of the screen extended from the first portion of the screen is to be displayed.

FIG. 9 illustrates an example of another window, being displayed with a window for guiding the position where the second portion of the screen extended from the first portion of the screen is to be displayed, for guiding the position where the third portion of the screen extended from the first portion of the screen is to be displayed.

Referring to FIG. 8, in operation 801, the processor 120 may identify that while the first portion of the screen is displayed in the display region having the first size, the second portion of the screen extending from a first edge (e.g., edge 531 of FIG. 5) of the first portion of the screen, and a third portion of the screen extending from a second edge of the first portion of the screen parallel to the first edge of the first portion of the screen are not displayed. For example, the processor 120 may identify that the first portion of the screen is displayed in the display region having the first size, in a bidirectionally scrollable state.

In operation 803, the processor 120 may receive the predetermined input, while the first portion of the screen is displayed and the second portion of the screen and the third part of the screen are not displayed. For example, the processor 120 may receive the predetermined input, in the state of identifying that the first portion of the screen is displayed in a bidirectionally scrollable state according to operation 801.

FIG. 8 illustrates an example of executing operation 803 after executing operation 801, but this is only for convenience of description. Operation 801 may be executed after operation 803 is executed. For example, in response to the predetermined input, the processor 120 may identify that the first portion of the screen is displayed in a bidirectionally scrollable state.

In operation 805, in response to the predetermined input, the processor 120 may display, together with the window, another window for guiding a position where the third portion of the screen extending from the second edge of the first portion of the screen is to be displayed, when the size of the display region is changed to the second size, as partially superimposed on the first portion of the screen. For example, the window may be superimposed on a first area of the first portion of the screen including the first edge, and the other window may be superimposed on a second area of the first portion of the screen including the second edge. According to an embodiment, the second area of the first portion of the screen may be spaced apart from the first area of the first portion of the screen.

For example, referring to FIG. 9, as in the state 900, the processor 120 may display the first portion 911 of the screen 901 in the display region having the first size. For example, while the first portion 911 of the screen 901 is displayed in the display region having the first size, the second portion 921 of the screen 901 extending from the first edge 912 of the first portion 911 of the screen 901 and the third portion 931 of the screen 901 extending from the second edge 913 of the first portion 911 of the screen 901 may not be displayed. For example, the processor 120 may receive the predetermined input in the state 900. The processor 120 may change the state 900 to a state 950 in response to the predetermined input.

For example, in the state 950, the processor 120, based on identifying that the first portion 911 of screen 901 is displayed in a bidirectionally scrollable state or identifying that there exist the second portion 921 of the screen 901 and the third portion 931 of the screen 901 that are not displayed while the first portion 11 of the screen is displayed, may display a window 951 for guiding a position where the second portion 921 of the screen 901 is to be displayed when the size of the display region is changed to the second size, and another window 952 for guiding a position where the third portion 931 of the screen 901 is to be displayed when the size of the display region is changed to the second size, as superimposed on the first portion 911 of the screen 901. For example, the window 951 may be superimposed on a first area of the first portion 911 of the screen 901 including the first edge 912, and the other window 952 may be superimposed on a second area of the first portion 911 of the screen 901, including the second edge 913 and spaced apart from the first area. In other words, the window 951 and the other window 952 may be superimposed on opposite ends of the screen 901.

According to an embodiment, the window 951 may be visually highlighted with respect to the other window 952. For example, unlike the third portion 931 of the screen 901 positioned before the first portion 911 of the screen 901, the second portion 921 of the screen 901 is located behind the first portion 911 of the screen 901, so the window 951 can be visually emphasized with respect to the other windows 952. For example, the window 951 may have a color that is more highlighted than that of the other windows 952. For example, the window 951 may have a brightness greater than that of other windows 952. For example, the window 951, unlike other windows 952, may flicker. However, the disclosure is not limited thereto.

As described above, the electronic device 101, based on identifying that the first portion of the screen is displayed to be bidirectionally scrollable in the display region having the first size, may display the other window together with the window. For example, the electronic device 101 may display the window and the other window to recognize the arrangement of the remaining portion of the screen that is not displayed in the display region having the first size and the first portion of the screen displayed in the display region having the first size. For example, the electronic device 101 may provide an enhanced user experience through the display of the window and the other window.

Figure 10:
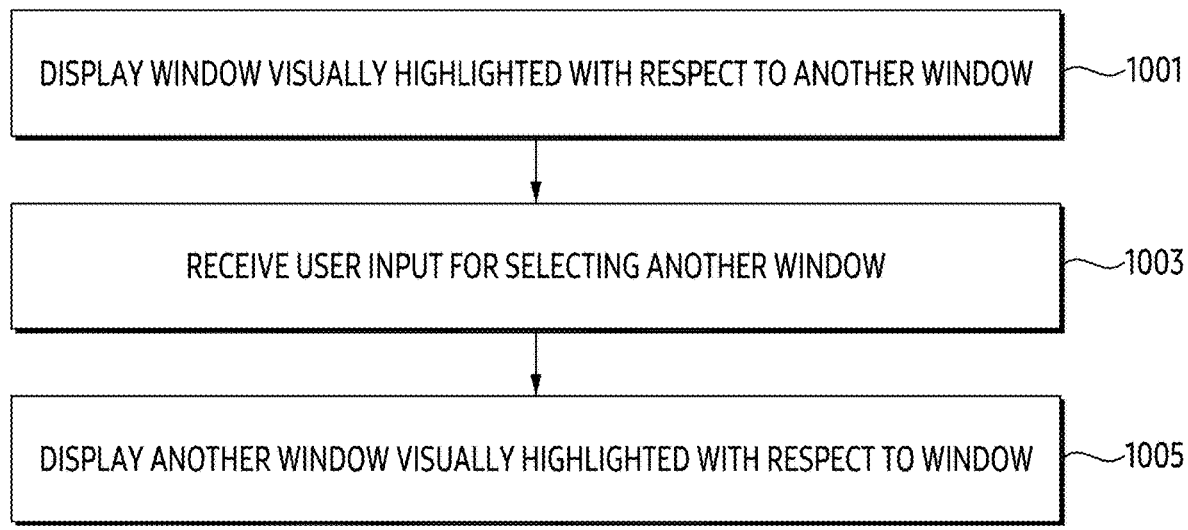
FIG. 10 illustrates an exemplary method of selecting one of a window and another window.

FIG. 10 illustrates an exemplary method of selecting one of a window and another window. This method may be executed by the electronic device 101 illustrated in FIG. 1 or the processor 120 of the electronic device 101.

Operations 1001 to 1005 of FIG. 10 may be included in operation 805 of FIG. 8.

Figure 11A:
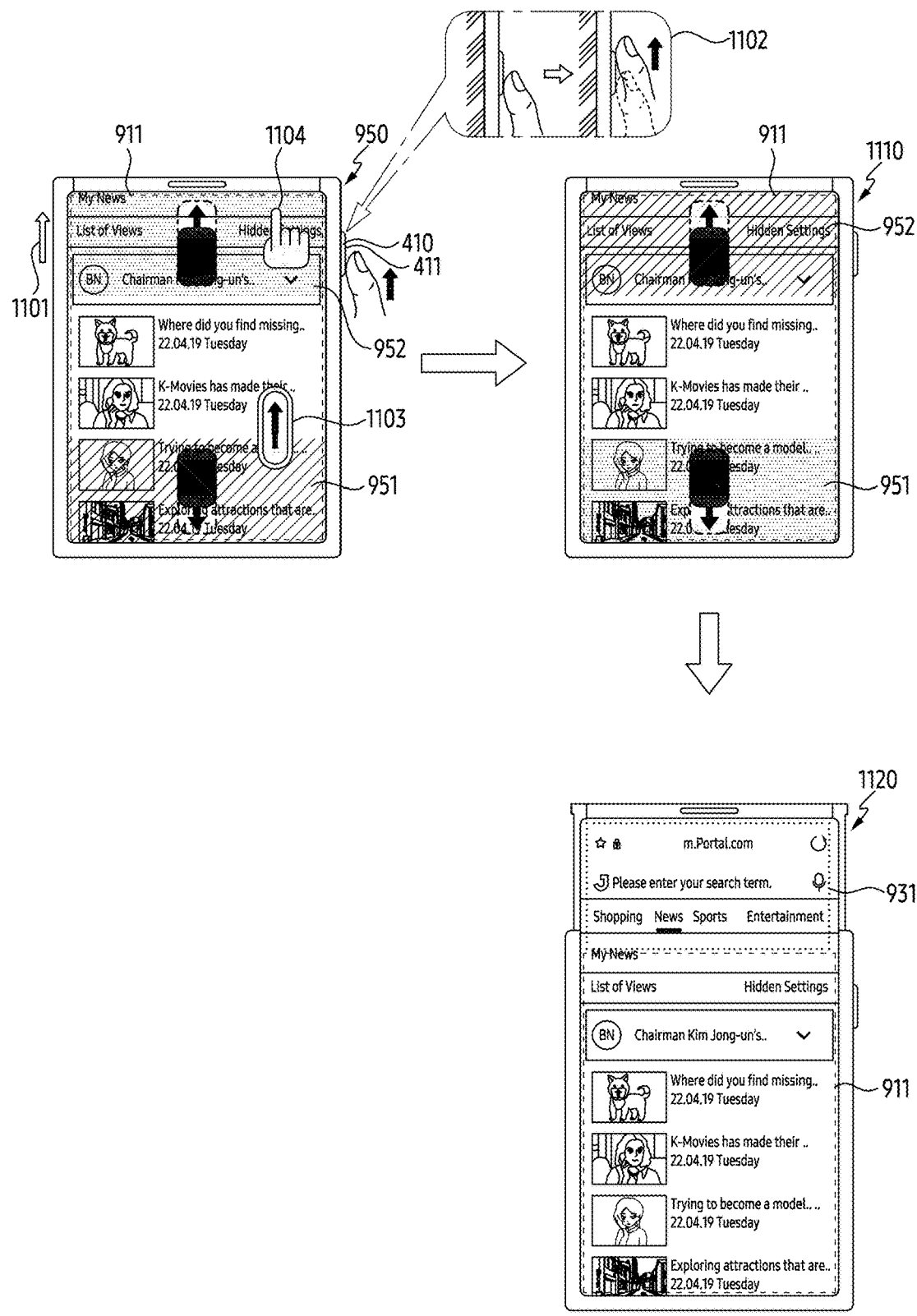
FIGS. 11A and 11B illustrate examples of the screen displayed in response to a user input for selecting another window amongst a window and another window.
Figure 11B:
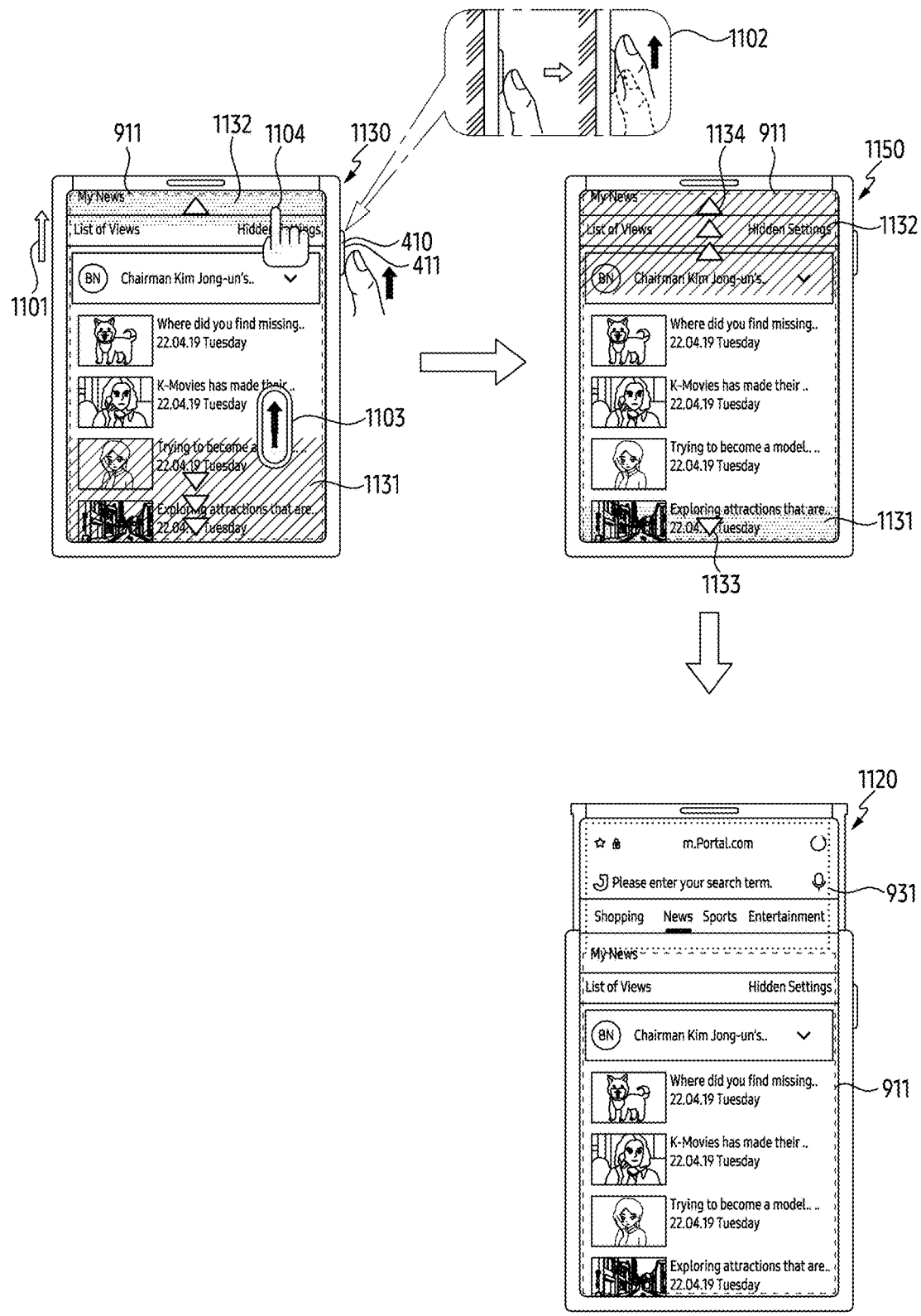

FIGS. 11A and 11B illustrate examples of a screen displayed in response to a user input for selecting another window of a window and another window.

Referring to FIG. 10, in operation 1001, the processor 120 may display the window visually highlighted with respect to the other window. For example, the window, when the size of the display region is changed to the second size, may be visually highlighted with respect to the other window to indicate that the second portion of the screen of the second portion of the screen and the third part of the screen is scheduled to be displayed. For example, the window may be visually highlighted with respect to the other window to indicate that the second portion of the screen of the second portion of the screen and the third part of the screen is selected as a portion of the screen to be displayed together with the first portion of the screen. However, the disclosure is not limited thereto.

In operation 1003, the processor 120 may receive a user input for selecting the other window among the window and the other window, while the window visually highlighted with respect to the other window is displayed. For example, the user input received in operation 1003 may be defined differently from the predetermined input. For example, referring to FIG. 11A, in the state 950, the processor 120 may receive the user input for selecting the other window among the window and the other window. For example, when the predetermined input is an input for pressing the physical button 410 so that one end 411 of the physical button 410 is moved by a distance between the first reference distance and the second reference distance, the user input may be an input 1102 released after a contact point on the physical button 410 pressed by the predetermined input is moved in a first direction 1101 (or a second direction opposite to the first direction 1101) the third portion 931 of the screen 901 extends from the first portion 911 of the screen 901. For example, the processor 120 may identify an input 1102 via a fingerprint sensor included within the physical button 410. For example, when the predetermined input is an input to press the physical button 410 such that one end 411 of the physical button 410 is moved by a distance between the first reference distance and the second reference distance, or the input means 460 spaced apart by a distance H from the display region is an input maintained for a predetermined time, the user input may be an input 1103 released after the contact point on the window 951 is moved toward other window 952 or is moved in the first direction 1101 (or the second direction). For example, in case where the predetermined input is an input to press the physical button 410 such that one end 411 of the physical button 410 is moved by a distance between the first reference distance and the second reference distance, or the input means 460 spaced apart by the distance H from the display region is an input maintained for a predetermined time, the user input may be an input 1104 for tapping the other window 952 of the window 951 and the other window 952. However, the disclosure is not limited thereto.

For example, the processor 120 may change the state 950 to a state 1110 in response to the user input. For example, in the state 1110, the processor 120 may cease displaying the window 951 that is visually highlighted relative to the other window 952, and display the other window 952 that is visually highlighted relative to the window 951.

For example, as in the state 1110, the processor 120 may receive the user input for changing the size of the display region to the second size, while the other window 952 visually highlighted with respect to window 951 is displayed partially superimposed on first portion 911 of screen 901. For example, the user input for changing the size to the second size may correspond to the user input received in operation 601 of FIG. 6. For example, the processor 120 may change the state 1110 to a state 1120 in response to the user input for changing the size to the second size. For example, the processor 120 may change the state 1110 to the state 1120 by extending the display region through the actuator 150. For example, in the state 1120, the display region may have the second size. For example, in the state 1120, the processor 120 may display the first portion 911 of the screen 901 and the third portion 931 of the screen 901 extending from the first portion 911 of the screen 901.

The window 951 and the other window 952 may be replaced with a window 1131 and another window 1132 shown in FIG. 11B, respectively. For example, referring to FIG. 11B, in the state 1130, the processor 120 may display a highlighted window 1131 and another window 1132 visually with respect to another window 1132, as partially superimposed on the first portion 911 of screen 901. For example, the window 1131 visually highlighted with respect to the other window 1132 may be larger than the other window 1132, unlike the window 951 having the same size as the other window 952. For example, the window 1131 may include a visual object 1133 (e.g. three arrows) indicating a direction in which the second portion 921 of the screen 901 extends from the first portion 911 of the screen 901, and the other window 1132 may include a visual object 1134 (e.g. a single arrow) indicating a direction in which the third portion 931 of the screen 901 extends from the first portion 911 of the screen 901. The visual object 1133 and/or the visual object 1134 may have a size and/or a number of elements (e.g. arrows) based on the direction in which the second portion 921 or the third portion 931 of the screen 901 extends from the first portion 911 of the screen 901. For example, one of the visual objects 1133, 1134 indicating the selected direction in which the screen 901 is to be extended may comprise three arrows, whereas the other one of the visual objects 1133, 1134 indicating another direction in which the screen 901 is selectively extendable may comprise a single arrow. However, the disclosure is not limited thereto.

For example, the processor 120 may change the state 1130 to the state 1150 in response to the user input received in operation 1003. For example, in the state 1150, the processor 120 may display the other window 1132 visually highlighted with respect to the window 1131. For example, the size of the other window 1132 in the state 1150 may be larger than the size of the other window 1132 in the state 1130. For example, the size of the window 1131 in the state 1150 may be smaller than the size of the window 1131 in the state 1130. However, the disclosure is not limited thereto.

For example, the processor 120, as in state 1150, may receive the user input for changing the size of the display region to the second size, while the other window 1132 visually highlighted with respect to the window 1131 is displayed as partially superimposed on first portion 911 of screen 901. For example, the user input for changing the size to the second size may correspond to the user input received in operation 601 of FIG. 6. For example, the processor 120 may change the state 1150 to the state 1120 in response to the user input for changing the size to the second size. For example, the processor 120 may change the state 1150 to the state 1120 by extending the display region through the actuator 150. For example, in the state 1120, the display region may have the second size. For example, in the state 1120, the processor 120 may display the first portion 911 of the screen 901 and the third portion 931 of the screen 901 extending from first portion 911 of the screen 901.

As described above, by displaying the window and the other window, the electronic device 101 can intuitively provide the position of information (e.g., the second portion of the screen or the third portion of the screen) to be additionally (or newly) displayed after the display region is extended, by display the window and the other window. For example, the electronic device 101 may provide a function of selecting one of the window and the other window through an input, so that the user can select a state after the display region is extended. For example, the electronic device 101 can provide an enhanced user experience through the display of the window and the other window.

Figure 12:
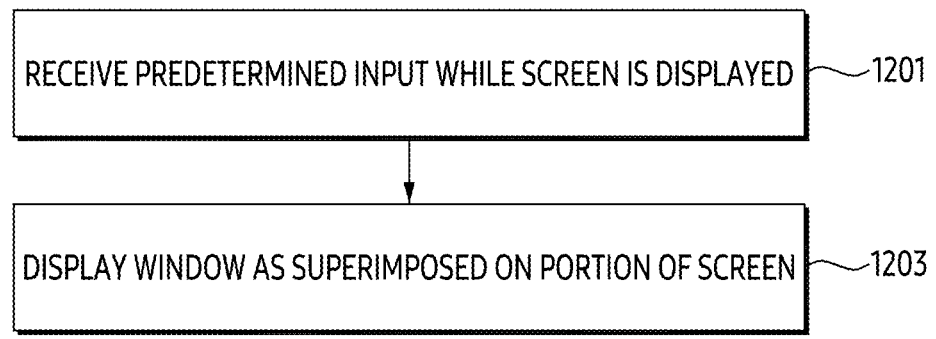
FIG. 12 illustrates an exemplary method of displaying a window for guiding a portion of the screen of which display is to be ceased.

FIG. 12 illustrates an exemplary method of displaying a window for guiding a portion of the screen of which display is to be ceased. This method may be executed by the electronic device 101 illustrated in FIG. 1 or the processor 120 of the electronic device 101.

Figure 13A:
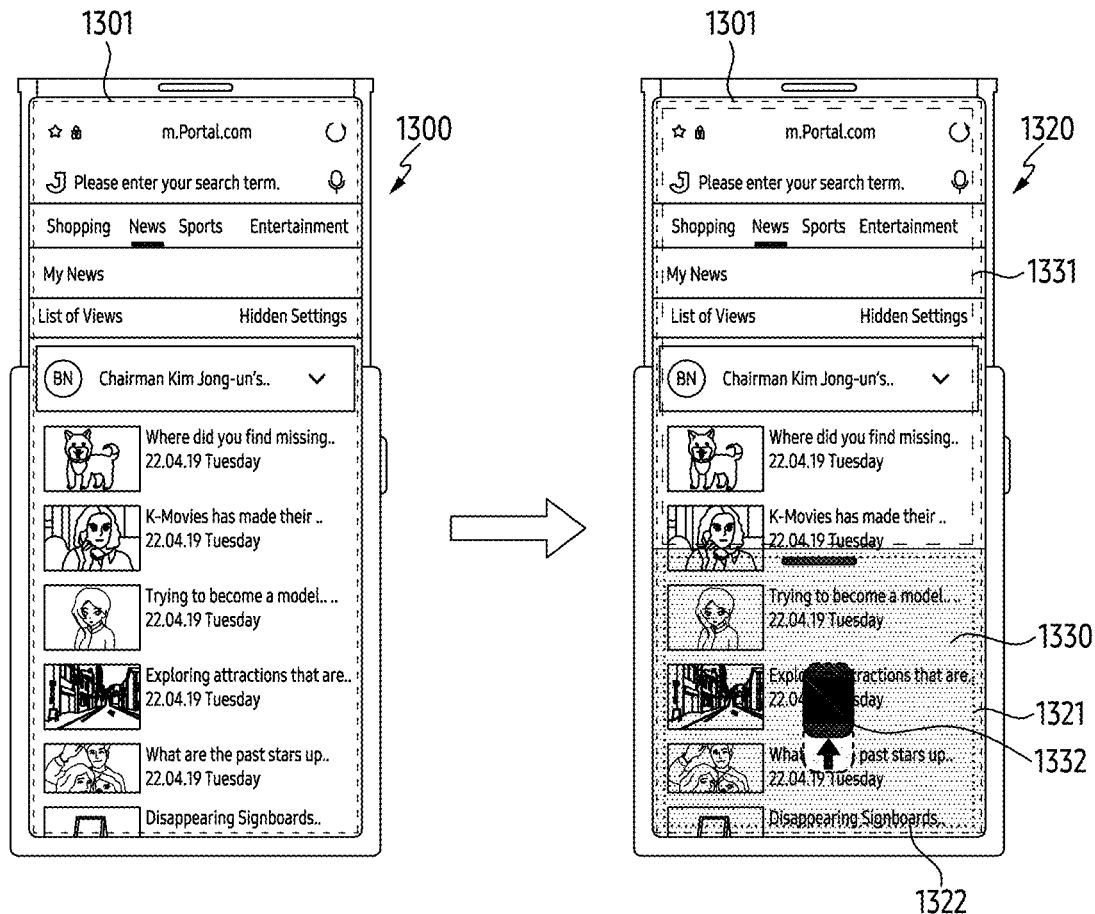
FIG. 13A illustrates an example of a window for guiding a portion of the screen of which display is to be ceased.

FIG. 13A illustrates an example of a window for guiding the portion of the screen of which display is to be ceased.

Figure 13B:
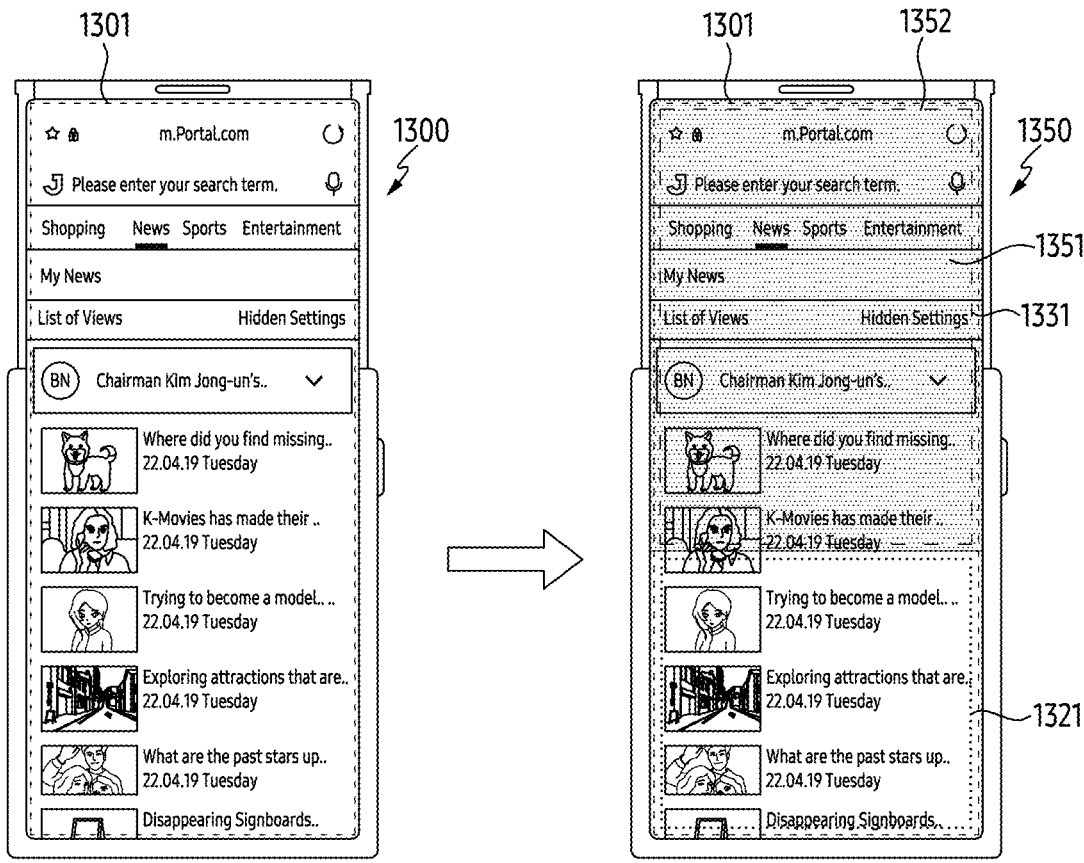
FIG. 13B illustrates an example of a window for guiding a portion of the screen of which display is to be maintained.

FIG. 13B illustrates an example of a window for guiding the portion of the screen of which display is to be maintained.

Referring to FIG. 12, in operation 1201, the processor 120 may receive a predetermined input while a screen is displayed in a state that the display region has a first size.

For example, the first size may refer to the size of the display region before the display region is changed. For example, the first size may refer to the size of the display region before operation 1403, which will be illustrated through the description of FIG. 14. For example, the first size in operation 1201 may be provided in a state in which the display region can be reduced. For example, the first size in operation 1201 may be provided in the second state 250 illustrated through the description of FIG. 2. For example, the first size in operation 1201 may be provided in an intermediate state between the first state 210 and the second state 250 illustrated through the description of FIG. 2. However, the disclosure is not limited thereto.

For example, the screen may be larger than the second size, which is the size of the display region after the display region is changed. For example, the second size will be illustrated through the description of operation 1203. For example, since the size of the screen is larger than the second size, the processor 120, while the electronic device 101 provides the display region having the second size, may cease to display a portion of the screen, and display the remaining portion of the screen. For example, while the display region having the second size is provided, the remaining portion of the screen may be displayed and the portion of the screen may not be displayed.

For example, the predetermined input may be an input for triggering execution of operation 1203 to be illustrated below. For example, the predetermined input may correspond to the predetermined input defined through the description of FIGS. 3 and 4. However, the disclosure is not limited thereto.

In operation 1203, based on the predetermined input, the processor 120 may display a window for guiding the portion of the screen, of which display is to be ceased when the size of the display region is changed from the first size to the second size smaller than the first size, as superimposed on the portion of the screen.

For example, the second size may mean the size of the display region after the display region is changed. For example, the second size may mean the size of the display region reduced according to the user input in operation 1401, which will be illustrated through the description of FIG. 14. For example, the second size may be provided in a state in which the display region can be extended. For example, the second size may be provided in the first state 210 illustrated through the description of FIG. 2. For example, the second size may be provided in another state distinct from the second state 250 illustrated through the description of FIG. 2. However, the disclosure is not limited thereto.

For example, the size of the window or the size of the portion of the screen may correspond to a difference in between the first size and the second size.

For example, referring to FIG. 13A, as in the state 1300, the processor 120 may display the screen 1301 in the display region having the first size. For example, the processor 120 may receive the predetermined input while the screen 1301 is displayed. The processor 120 may change the state 1300 to the state 1320 in response to the predetermined input. For example, in the state 1320, the processor 120 may display a window 1330 for guiding a portion 1321 of the screen 1301 of which display is to be ceased when the size of the display region is changed from the first size to the second size, as superimposed on the portion 1321 of the screen 1301.

For example, the size of the window 1330 may correspond to a difference between the first size and the second size. For example, the window 1330 may be translucent so that the portion 1321 of the screen 1301 positioned below the window 1330 is viewable.

According to an embodiment, the window 1330 may further include a visual object 1332 for indicating a positional relationship between the portion 1321 of the screen 1301 and the remaining portion 1331 of the screen 1301. However, the disclosure is not limited thereto. According to an embodiment, the visual object 1332 may further indicate a direction in which the portion of the screen disappears while the size of the display region is changed from the first size to the second size. The visual object 1332 may be an arrow and/or a slidable bar (e.g. a slidable bar combined with an arrow). However, the disclosure is not limited thereto.

Figure 14:
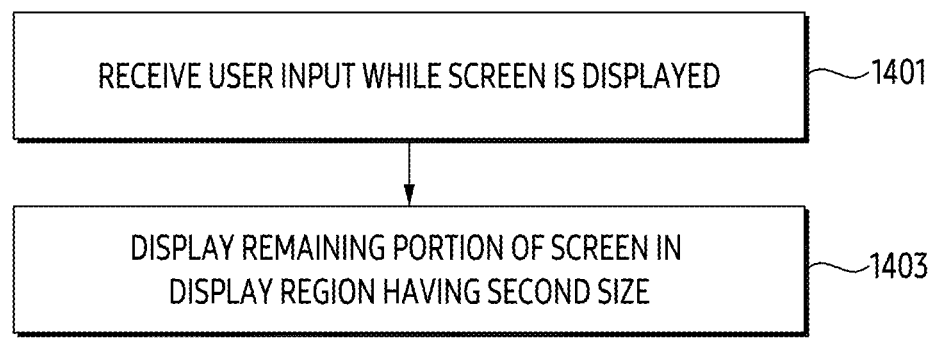
FIG. 14 illustrates an exemplary method of displaying a remaining portion of the screen.

According to an embodiment, the window 1330 may be displayed while the predetermined input is maintained. According to an embodiment, the display of window 1330 may be ceased based on releasing of the predetermined input. For example, the display of window 1330 may cease in response to identifying that the predetermined input is released. For example, the processor 120 may change state 1320 to state 1300 in response to ceasing of the display of the window 1330. For example, the display of window 1330 may cease in response to identifying that a reference time has elapsed from the timing at which the predetermined input was released. The reference time may be 0.1 seconds or more and/or 5 seconds or less, in particular, 0.3 seconds or more and/or 2 seconds or less, particularly preferred 0.5 seconds or more and/or 1 second or less. For example, the processor 120 may change the state 1320 to the state 1300 in response to the ceasing of the display of the window 1330. For example, the display of the window 1330 may cease in response to identifying that the user input, which will be illustrated through the description of operation 1401 of FIG. 14, is received after the predetermined input is released. However, the disclosure is not limited thereto.

According to an embodiment, the processor 120, in response to the predetermined input, may display, instead of the window 1330, a visual effect (or visual affordance) for guiding the portion 1321 of the screen 1301 of which display is to be ceased, when the size of the display region is changed to the second size. For example, the visual effect may be displayed along an edge 1322 of the portion 1321 of the screen 1301. For example, the visual effect may be flickering caused to be made along the edge 1322 of the portion 1321 of the screen 1301. However, the disclosure is not limited thereto.

According to an embodiment, in response to the predetermined input, the processor 120 may change representation of the portion 1321 of the screen 1301, instead of the window 1330, for guiding the portion 1321 of the screen 1301 of which display is to be ceased when the size of the display region is changed to the second size. For example, the processor 120 may change the representation of the portion 1321 of the screen 1301 by changing the color of the portion 1321 of the screen 1301. However, the disclosure is not limited thereto.

In the following descriptions, it will be described that the window 1330 is displayed to guide the portion 1321 of the screen 1301 of which display is to be ceased, but this is only for convenience of description. Displaying the window 1330 in the following descriptions may be replaced by displaying the visual effect or changing the representation of the portion 1321 of the screen 1301.

Referring back to FIG. 12, in an embodiment, the processor 120, in response to the predetermined input, may display a window for guiding the remaining portion of the screen maintained independently of changing the size of the display region to the second size, instead of displaying the window 1330, as superimposed on the remaining portion of the screen. For example, the remaining portion of the screen may mean a partial area of the screen that is distinguished from the portion of the screen of which display is ceased when the size of the display region is changed to the second size. For example, referring to FIG. 13B, the processor 120 may receive the predetermined input in the state 1300. For example, the processor 120 may change the state 1300 to the state 1350 in response to the predetermined input. For example, in the state 1350, the processor 120 may display a window 1351 for guiding the remaining portion 1331 of the screen 1301 maintained independently of changing the size of the display region to the second size, as superimposed on the remaining portion 1331 of the screen 1301.

For example, the size of the window 1351 may correspond to the second size. For example, the window 1351 may be translucent so that the remaining portion 1331 of the screen 1301 positioned below the window 1351 is viewable.

Although not shown in FIG. 13B, in an embodiment, the window 1351 may further include a visual object for indicating a positional relationship between the portion 1321 of the screen 1301 and the remaining portion 1331 of the screen 1301. For example, the visual object may be the same as or similar to the visual object 1332 of FIG. 13A. However, the disclosure is not limited thereto. According to an embodiment, the visual object may further indicate a direction in which the portion of the screen disappears while the size of the display region is changed from the first size to the second size. However, the disclosure is not limited thereto.

According to an embodiment, the window 1351 may be displayed while the predetermined input is maintained. According to an embodiment, the display of the window 1351 may be ceased based on releasing of the predetermined input. For example, the display of window 1351 may cease in response to identifying that the predetermined input is released. For example, the processor 120 may change the state 1350 to the state 1300 in response to the ceasing of the display of the window 1351. For example, the display of the window 1351 may cease in response to identifying that a reference time has elapsed from the timing at which the predetermined input was released. The reference time may be 0.1 seconds or more and/or 5 seconds or less, in particular, 0.3 seconds or more and/or 2 seconds or less, particularly preferred 0.5 seconds or more and/or 1 second or less. For example, the processor 120 may change the state 1350 to the state 1300 in response to the ceasing of the display of the window 1351. For example, the display of the window 1351 may cease in response to identifying that the user input, which will be illustrated through the description of operation 1401 of FIG. 14, is received after the predetermined input is released. However, the disclosure is not limited thereto.

According to an embodiment, the processor 120, in response to the predetermined input, may display, instead of the window 1351, a visual effect (or a visual affordance) for guiding the remaining portion 1331 of the screen 1301 to be maintained independently of changing the size of the display region to the second size. For example, the visual effect may be displayed along an edge 1352 of the remaining portion 1331 of the screen 1301. For example, the visual effect may be flickering caused to be represented along the edge 1352 of the remaining portion 1331 of the screen 1301. However, the disclosure is not limited thereto.

According to an embodiment, the processor 120, in response to the predetermined input, may change the representation of the remaining portion 1331 of the screen 1301, instead of the window 1351, in order to guide the remaining portion 1331 of the screen 1301 to be maintained independently of changing the size of the display region to the second size. For example, the processor 120 may change the representation of the remaining part 1331 of the screen 1301, by changing the color of the remaining portion 1331 of the screen 1301. However, the disclosure is not limited thereto.

As described above, the electronic device 101 may guide information (e.g., the portion 1321 of the screen 1301) of which display is to be ceased when the size of the display region is changed to the second size, by displaying the window such as the window 1330 or the window 1351. For example, the electronic device 101 may include the window 1330 or the window 1351 in the display region having the first size, so that before the size of the display region is changed to the second size, the user can estimate the state of the display region having the second size. For example, since the window 1330 is superimposed on information of which display is to be ceased (e.g., the portion 1321 of the screen 1301), the window 1330 can intuitively guide the information of which display is to be ceased when the size of the display region is changed to the second size. For example, since the window 1351 is superimposed on the information of which display is to be ceased (e.g., the remaining portion 1331 of the screen 1301), the window 1351 can intuitively guide the information to be maintained regardless of changing the size of the display region to the second size. For example, the electronic device 101 can provide an enhanced user experience in relation to the change in size of the display region, through the window 1330 (or the window 1351).

FIG. 14 illustrates an exemplary method of displaying the remaining portion of the screen. This method may be executed by the electronic device 101 illustrated in FIG. 1 or the processor 120 of the electronic device 101.

Operations 1401 and 1403 of FIG. 14 may be included in operation 1203 of FIG. 12.

Figure 15:
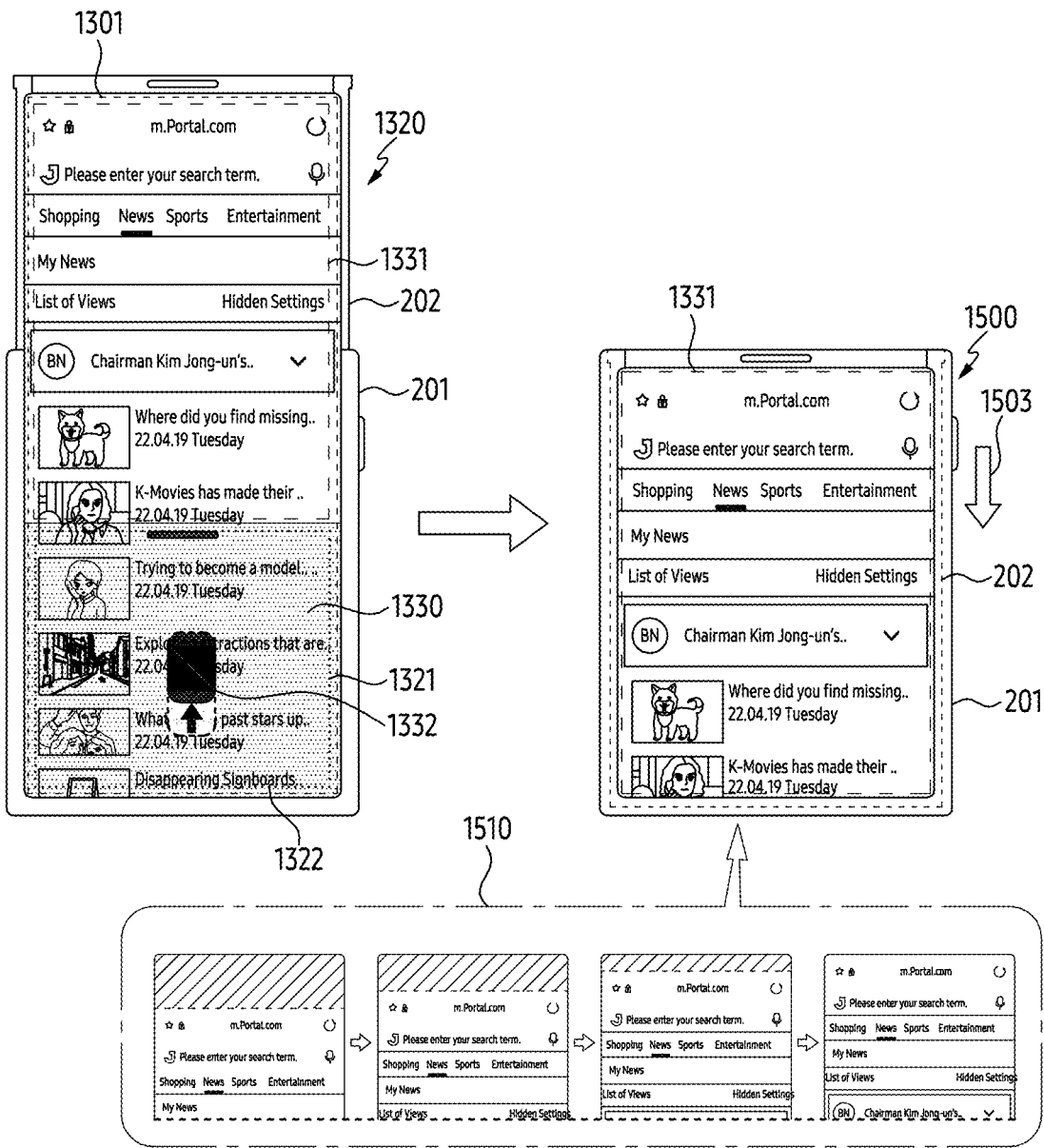
FIG. 15 illustrates an example of the remaining portion of the screen displayed after a size of the display region is changed.

FIG. 15 illustrates an example of the remaining portion of the screen displayed after the size of the display region is changed.

Referring to FIG. 14, in operation 1401, the processor 120 may receive the user input for changing the size of the display region from the first size to the second size smaller than the first size, while the window for guiding the portion of the screen is displayed. For example, the user input may be the user input illustrated through the description of FIG. 6.

In operation 1403, the processor 120 may display the remaining portion of the screen in the display region having the second size changed from the first size in response to the user input, and cease displaying the portion of the screen. For example, the processor 120 may change the size of the display region to the second size, by reducing the display region through the actuator 150, in response to the user input. For example, the processor 120 may display the remaining portion of the screen in the display region having the second size and cease displaying the portion of the screen. For example, the portion of the screen may disappear in a direction in which the display region is reduced, while the size of the display region is changed from the first size to the second size.

For example, referring to FIG. 15, as in the state 1320, the processor 120 may display the window 1330 superimposed on the portion 1321 of the screen 1301, in the display region having the first size. For example, in the state 1320, the processor 120 may receive the user input while the window 1330 is displayed. The processor 120 may change the state 1320 to a state 1500 in response to the user input. For example, the processor 20 may change the size of the display region to the second size based on reduction of the display region through the actuator 150, thereby changing the state 1320 to the state 1500.

For example, in the state 1500, the processor 120 may cease displaying the window 1330, and display the remaining portion 1331 of the screen 1301 in the display region having the second size.

According to an embodiment, when the second size is the size of the display region in the first state 210, the processor 120 may display a visual effect for indicating that the display region can be reduced no more, in response to changing the size of the display region to the second size. For example, the visual effect may be a bounce back effect 1510 of moving the remaining portion 1331 of the screen 1301 moved in the direction 1503 the second housing 202 is moved relative to the first housing 201, in a direction opposite to the direction 1301. However, the disclosure is not limited thereto.

Figure 16:
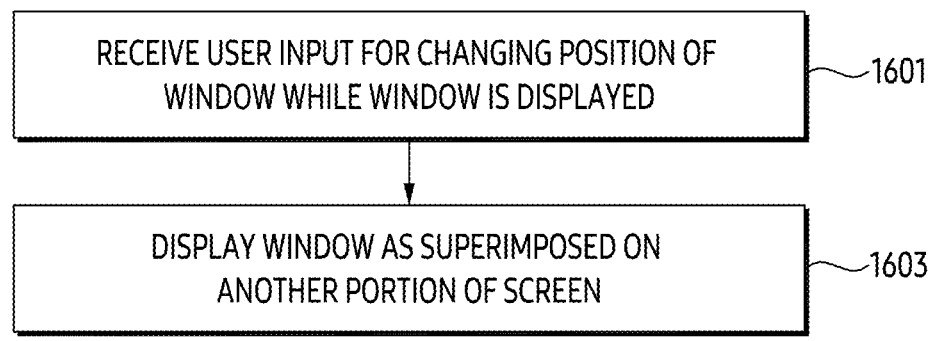
FIG. 16 illustrates an exemplary method of changing a position of a window for guiding a portion of the screen of which display is to be ceased.

FIG. 16 illustrates an exemplary method of changing a position of a window for guiding the portion of the screen of which display is to be ceased. This method may be executed by the electronic device 101 illustrated in FIG. 1 or the processor 120 of the electronic device 101.

Operations 1601 and 1603 of FIG. 16 may be included in operation 1203 of FIG. 12.

Figure 17A:
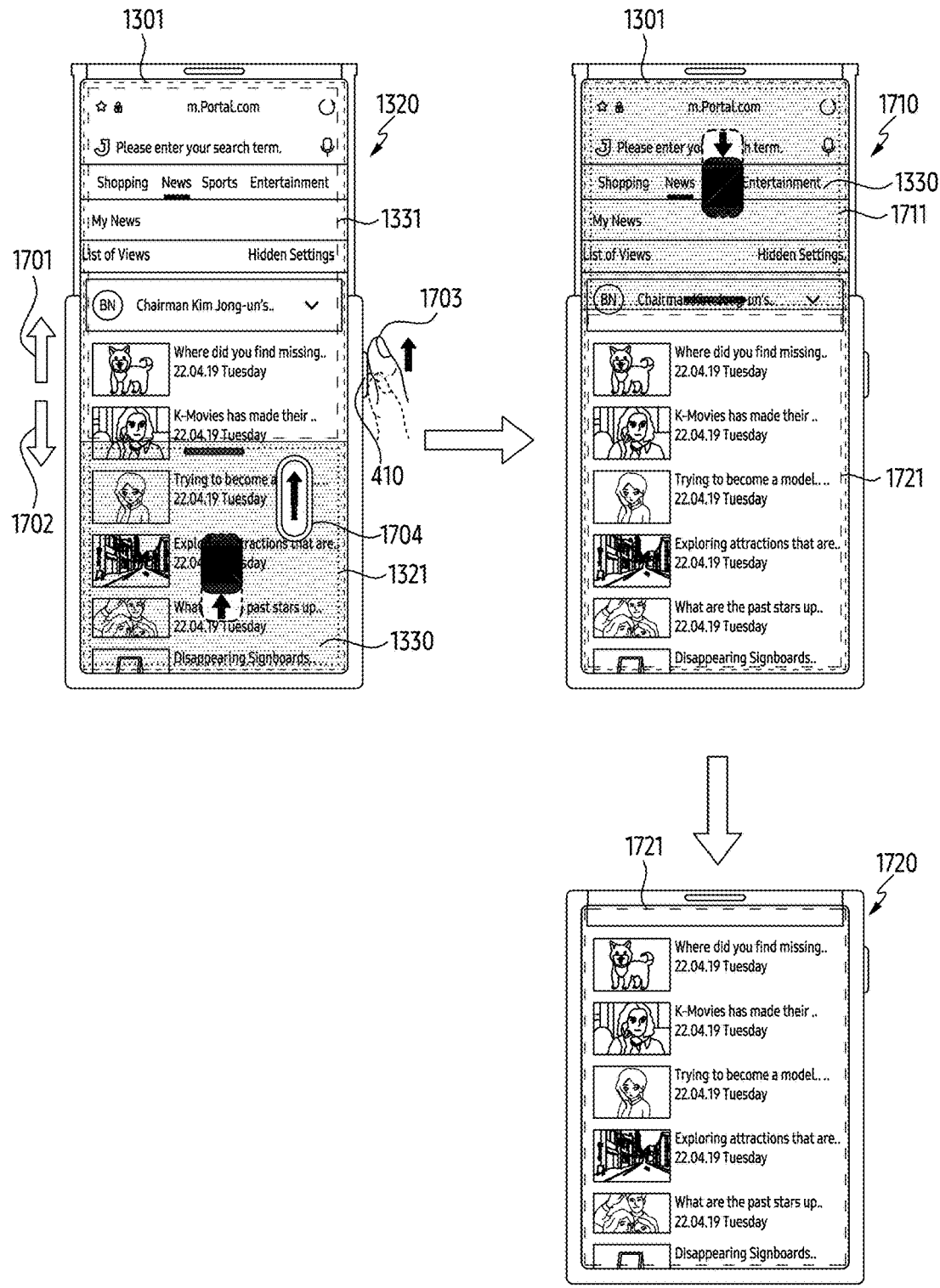
FIGS. 17A and 17B illustrate examples of windows that are moved in response to a user input.
Figure 17B:
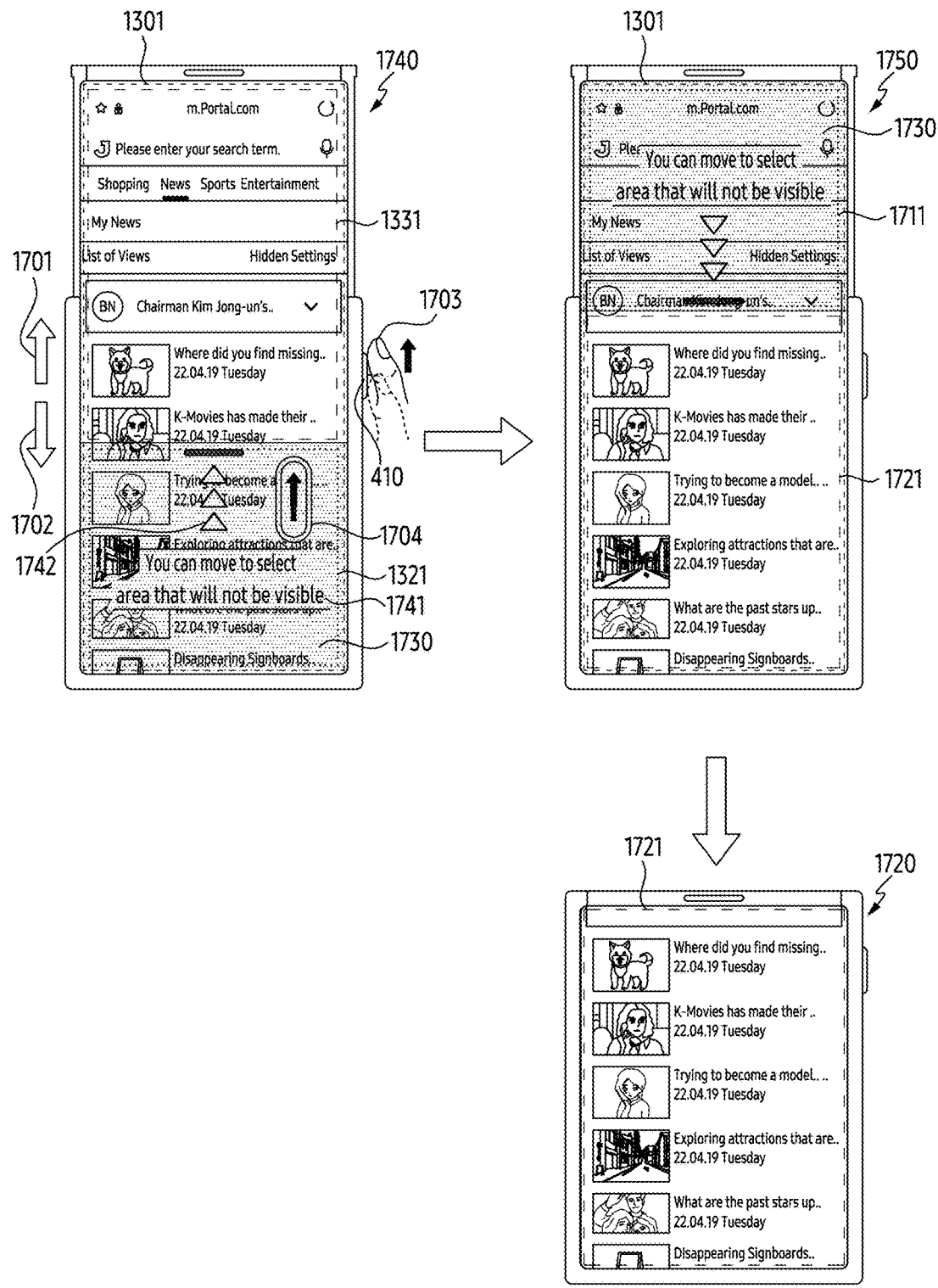

FIGS. 17A and 17B illustrates examples of a window that is moved in response to a user input.

Referring to FIG. 16, in operation 1601, the processor 120 may receive a user input for changing the position of the window, while the window for guiding the portion of the screen (e.g., the portion 1321 of the screen 1301 of FIG. 13A) of which display is to be ceased when the size of the display region is changed to the second size is displayed. For example, the user input may be defined to change the portion of the screen (e.g., the portion 1321 of the screen 1301 of FIG. 13A), of which display is to be ceased when the size of the display region is changed to the second size, to the other portion of the screen (e.g., another portion 1711 of the screen 1301 of each of FIGS. 17A and 17B to be illustrated below). For example, the user input may be different from the predetermined input illustrated through the description of FIG. 12 and the user input illustrated through the description of FIG. 14. For example, the user input may be the same as or similar to the user input received in operation 1003 of FIG. 10. For example, referring to FIG. 17A, the processor 120 may receive the user input for changing the position of the window 1330 in the state 1320. For example, the user input may be an input released after the contact point on the physical button 410 pressed by the predetermined input is moved in a first direction 1701 (or in a second direction 1702 opposite to the first direction 1701). For example, the processor 120 can identify an input 1703 through a fingerprint sensor included in the physical button 410. For example, the user input may be an input 1704 released after the contact point on the window 1330 is moved in the first direction 1701 (or the second direction 1702). However, the disclosure is not limited thereto.

Referring back to FIG. 16, in operation 1603, the processor 120 may display, by moving the window in response to the user input, the window for guiding that the portion of the screen of which display is to be ceased, when the size of the display region is changed from the first size to the second size, is the other portion of the screen (e.g., another portion 1711 of the screen 1301 of each of FIGS. 17A and 17B to be illustrated below), as superimposed on the other portion of the screen (e.g., another portion 1711 of the screen 1301 of each of FIGS. 17A and 17B to be illustrated below). For example, referring to FIG. 17A, the processor 120 may receive the user input in the state 1320. The processor 120 may change the state 1320 to a state 1710 in response to the user input.

For example, while the state 1320 is changed to the state 1710, the window 1330 may be moved in response to the user input. For example, in the state 1710, the processor 120 may display a window 1330 superimposed on the other portion 1711 of the screen for its display to be ceased when the size of the display region is changed to the second size, based on the movement of the window 1330 according to the user input. For example, displaying the window 1330 superimposed on the portion 1321 of the screen 1301 may be ceased or terminated according to switching to the state 1710.

For example, the processor 120 may receive the user input for changing the size of the display region to the second size, while the window 1330 superimposed on the other portion 1711 of the screen 1301 is displayed. For example, the user input for changing the size to the second size may correspond to the user input received in operation 601 of FIG. 6 or operation 1401 of FIG. 14. For example, the processor 120 may change the state 1710 to a state 1720, in response to the user input. For example, the processor 120 may change the state 1710 to the state 1720 by reducing the display region through the actuator 150. For example, in the state 1720, the display region may have the second size. For example, in the state 1720, the processor 120 may display a portion 1721 of the screen 1301 that is distinguished from the other portion 1711 of screen 1301.

The window 1330 may be replaced with the window 1730 shown in FIG. 17B. For example, referring to FIG. 17B, in the state 1740, the processor 120 may display the window 1730, as superimposed on the portion 1321 of the screen 1301. For example, unlike the window 1330, the window 1730 may include a text 1741 for guiding that the window 1730 is movable according to the user input received in operation 1601. The window 1730 may include a visual object 1742 for guiding a direction the display region is reduced, having a shape different from that of the visual object 1332 in the window 1330. However, the disclosure is not limited thereto.

The processor 120 may change the state 1740 to a state 1750 in response to the user input (e.g., the input 1703 or the input 1704). For example, while the state 1740 is changed to the state 1750, the window 1730 may be moved in response to the user input. For example, in the state 1750, the processor 120 may display the window 1730 superimposed on other portion 1711 of the screen 1301 for its display to be ceased when the size of the display region is changed to the second size, based on the movement of the window 1730 according to the user input. For example, displaying the window 1730 superimposed on the portion 1321 of the screen 1301 may be ceased or terminated according to switching to the state 1750.

For example, the processor 120 may receive the user input for changing the size of the display region to the second size, while the window 1730 superimposed on the other portion 1711 of the screen 1301 is displayed. For example, the user input for changing the size to the second size may correspond to the user input received in operation 601 of FIG. 6 or operation 1401 of FIG. 14. For example, the processor 120 may change the state 1750 to the state 1720 in response to the user input. For example, the processor 120 may change the state 1750 to the state 1720, by reducing the display region through the actuator 150. For example, in the state 1720, the display region may have the second size. For example, in the state 1720, the processor 120 may display a portion 1721 of the screen 1301 that is distinguished from the other portion 1711 of the screen 1301.

FIGS. 17A and 17B show an example of the position of the window 1330 (or window 1730) being changed, independent of the distance the contact point on the physical button 410 or the contact point on the window 1330 (or window 1730) was moved, but the position of the window 1330 (or the window 1730) may be moved a position corresponding to the distance the contact point on the physical button 410 or the contact point on the window 1330 (or the window 1730) was moved. For example, in response to a user input released after the contact point on the physical button 410 is moved by a first distance, the processor 120 may identify whether the display of the portion of the screen 1301 located under the window 1330 (or the window 1730) moved by a distance corresponding to the first distance can be ceased when the size of the display region is changed to the second size. The processor 120, based on identifying that the display can be ceased, may maintain the position of the window 1330 moved by the distance, and based on identifying that the display cannot be ceased, move the window 1330 moved by the distance to the position before the user input is received. For example, the processor 120 may provide scrolling of the screen 1301 together, when the size of the display region is changed to the second size, according to the position of the window 1330 moved by the distance. For example, the processor 120 may receive the user input for changing the size of the display region to the second size, while the window 1330 moved by the distance is displayed at a position spaced apart from edges of the display region perpendicular to the direction the display region is reduced. In response to the user input, in order to cease displaying of the portion of the screen 1301 located below the window displayed at the position after the size of the display region is changed to the second size, the processor 120 may provide scrolling of the screen 1301 while the size of the display region is changed to the second size.

As described above, the electronic device 101 can intuitively guide information (e.g., the portion of the screen) that will disappear when the display region is reduced, by changing the position of the window. For example, the electronic device 101 can provide a function of moving the window so that the user can select a state after the display region is reduced. For example, the electronic device 101 can provide an enhanced user experience through moving the window.

Figure 18:
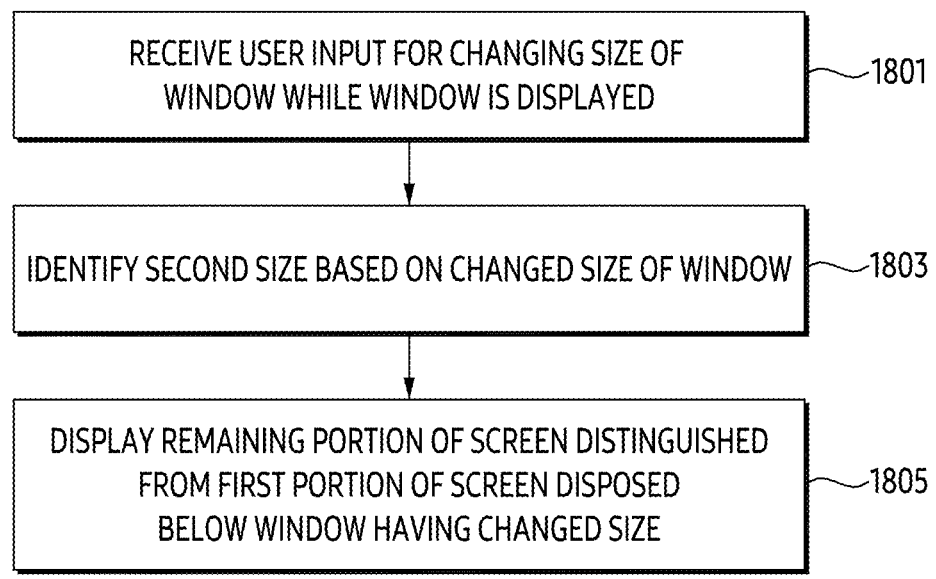
FIG. 18 illustrates an exemplary method of identifying a second size of a display region according to a change in size of the window.

FIG. 18 illustrates an exemplary method of identifying a second size of a display region according to a change in size of the window. This method may be executed by the electronic device 101 illustrated in FIG. 1 or the processor 120 of the electronic device 101.

Operations 1801 to 1805 of FIG. 18 may be included in operation 1203 of FIG. 12.

Figure 19:
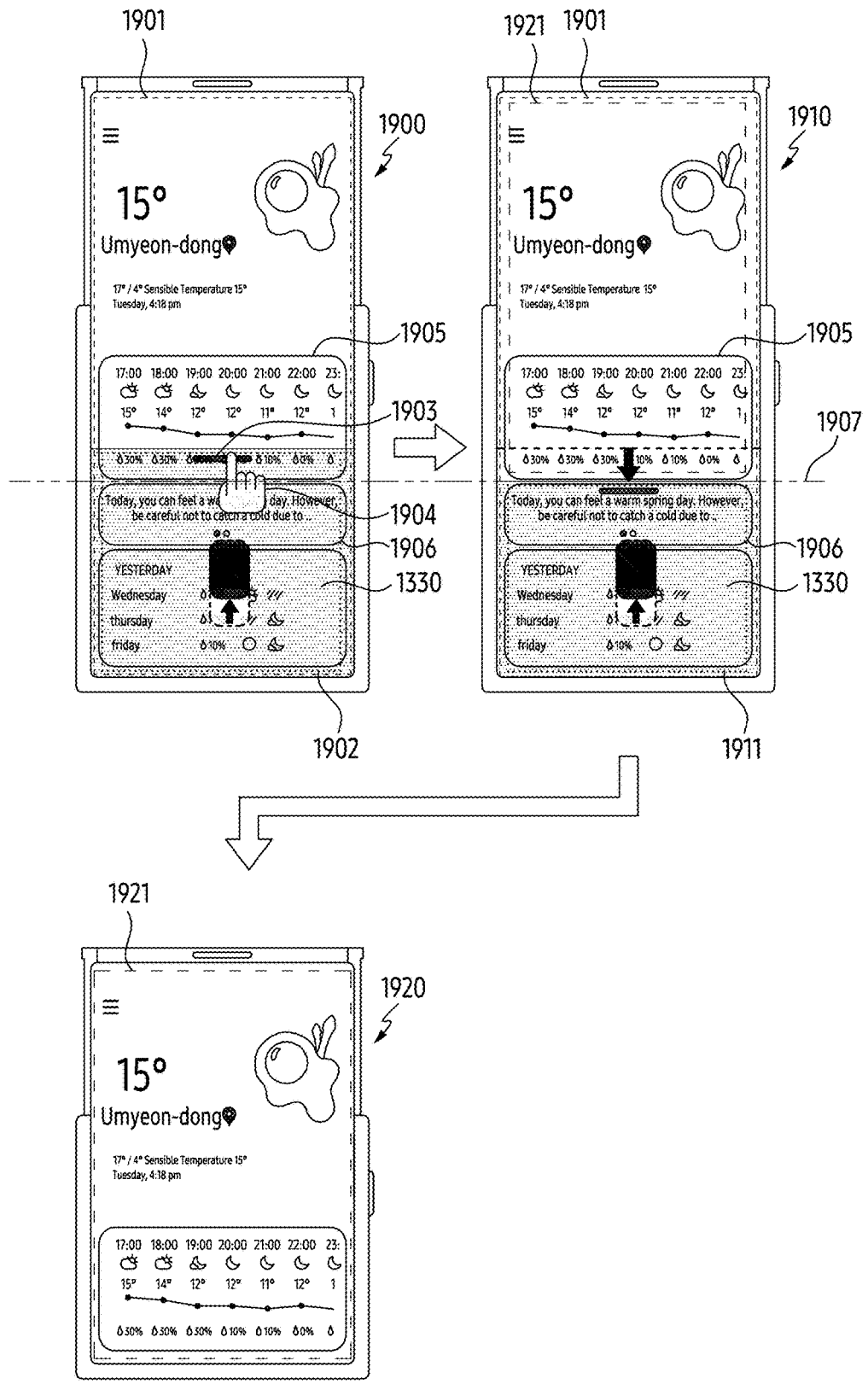
FIG. 19 illustrates an example of a window of which size is changed according to a user input.

FIG. 19 illustrates an example of a window of which size is changed according to a user input.

Referring to FIG. 18, in operation 1801, the processor 120 may receive a user input for changing the size of the window, while the window superimposed on the portion of the screen is displayed. For example, the user input may be an input for changing a position of a visual element (e.g., a handler) in the window. For example, the user input may be an input released after a contact point on the visual element in the window is moved. However, the disclosure is not limited thereto.

In operation 1803, in response to the user input, the processor 120 may identify the second size based on the changed size of the window.

In operation 1805, the processor 120 may, based on the identification, cease displaying the first portion of the screen positioned beneath the window having the changed size, and display the remaining portion of the screen, which is distinguished from the first portion of the screen, in the display region having the identified second size.

For example, referring to FIG. 19, in a state 1900, the processor 120 may display a window 1330 superimposed on the portion 1902 of the screen 1901. For example, the window 1330 may include a visual element 1903 for changing the size of window 1330. The processor 120 may receive, in the state 1900, an input 1904 that is released after a contact point on the visual element 1903 is moved. The processor 120 may identify the size of the window 1330 based on the input 1904.

According to an embodiment, the processor 120 may identify the size of the window 1330 based on the distance the contact point on the visual element 1903 travelled. For example, the processor 120 may identify the size of the window 1330 based on the position at which the contact point on the visual element 1903 is released. For example, the processor 120 may identify the size of the display region corresponding to the size of the window 1330. The processor 120 may identify whether the identified size is equal to or greater than the minimum size of the display region (e.g., the size of the display region provided in the first state 210), change the state 1900 to a state 1910 based on identifying that the identified size is greater than or equal to the minimum size of the display region, and maintain the state 1900 based on identifying that the identified size is less than the minimum size of the display region.

According to an embodiment, the processor 120 may identify the size of the window 1330, based on a boundary between the position where the contact point on the visual element 1903 is released and the contents included in the screen 1901. For example, the processor 120 may identify a boundary between the contents adjacent to the position where the contact point is released. For example, the processor 120 may identify that the position is adjacent to a boundary 1907 between the content 1905 and the content 1906, and in response to the identification, identify the size of the window 1330 in which the visual element 1903 is located in the boundary 1907. For example, the processor 120 may identify the size of the display region corresponding to the size of the window 1330. The processor 120 may identify whether the identified size is equal to or greater than the minimum size of the display region, and change the state 1900 to a state 1910 based on identifying that the identified size is equal to or greater than the minimum size of the display region, and maintain the state 1900 based on identifying that the identified size is less than the minimum size of the display region. However, the disclosure is not limited thereto.

For example, in the state 1910, the processor 120 may display the window 1330 having the size changed according to the user input 1904, as superimposed on the first portion 1911 of the screen 1901. For example, in the state 1910, the processor 120 may receive a user input for changing the size of the display region to the second size. The processor 120 may change the state 1910 to a state 1920 in response to the user input.

For example, in the state 1920, the processor 120 may cease displaying the first portion 1911 of the screen 1901, and display the remaining portion 1921 of the screen 1901 distinguished from the first portion 911 of screen 1901.

As described above, the electronic device 101 can provide a function for changing the size of the window 1330. For example, the electronic device 101 may identify the second size, which is a size of the display region after the display region is changed, based on the changed size. For example, in response to an input to the window 1330, the electronic device 101 may identify the second size of the display region and change the size of the display region to the identified second size. For example, the electronic device 101 can provide, through the window, a function of selecting the size of the display region to be changed as well as a function of selecting information for its display to be ceased after the size of the display region is changed.

It is to be noted that the operations illustrated through the descriptions of FIGS. 12 to 19 are not inseparably linked or connected with the operations illustrated through the descriptions of FIGS. 3 to 11.

FIG. 20A is a front view of a first state of an electronic device according to an embodiment. FIG. 20B is a rear view of a first state of an electronic device according to an embodiment. FIG. 20C is a front view of a second state of an electronic device according to an exemplary embodiment. And FIG. 20D is a rear view of a second state of an electronic device according to an embodiment.

Referring to FIGS. 20A, 20B, 20C, and 20D, an electronic device 2000 (e.g., the electronic device 101 of FIG. 1) according to an embodiment may include a first housing 2010, a second housing 2020, a display 2030 (e.g., the display 140 of FIG. 1), and a camera 2040. According to an embodiment, the second housing 2020 may be slidable with respect to the first housing 2010. For example, the second housing 2020 may move in a range within a designated distance along a first direction (e.g., +y direction) with respect to the first housing 2010. As the second housing 2020 moves in the first direction, a distance between the side surface 2020*a* of the second housing 2020 facing the first direction and the first housing 2010 may increase. As another example, the second housing 2020 may move in a range within a designated distance along a second direction (e.g., −y direction) opposite to the first direction with respect to the first housing 2010. As the second housing 2020 moves in the second direction, a distance between the side surface 2020*a* of the second housing 2020 facing the first direction and the first housing 2010 may decrease. According to an embodiment, the second housing 2020 may linearly reciprocate with respect to the first housing 2010, sliding relative to the first housing 2010. For example, at least a portion of the second housing 2020 may be slidable into the first housing 2010 or slidable out from the first housing 2010.

According to an embodiment, the electronic device 2000 may be referred to as a "slidable electronic device", as the second housing 2020 is designed to be slidable with respect to the first housing 2010. According to an embodiment, the electronic device 2000 may be referred to as a "rollable electronic device", as at least a portion of the display 2030 is designed to be rolled up inside the second housing 2020 (or the first housing 2010) based on the sliding movement of the second housing 2020.

According to an embodiment, the first state of the electronic device 2000 may be defined as a state (e.g., a contracted state or a slide-in state) that the second housing 2020 is moved in the second direction (e.g., −y direction). For example, in the first state of the electronic device 2000, the second housing 2020 may be movable in the first direction, but may not be movable in the second direction. In the first state of the electronic device 2000, the distance between the side surface 2020*a* of the second housing 2020 and the first housing 2010 may increase as the second housing 2020 moves, but it may not decrease. As another example, in the first state of the electronic device 2000, a portion of the second housing 2020 may be pulled-out into the first housing 2010, but it may not be pulled-in. According to an embodiment, the first state of the electronic device 2000 may be defined as a state in which the second area 2030*b* of the display 2030 is not visually exposed from the outside of the electronic device 2000. For example, in the first state of the electronic device 2000, the second area 2030*b* of the display 2030 may be positioned within an internal space (not shown) formed by the first housing 2010 and/or the second housing 2020 in the electronic device 2000, so that it may not be visible from the outside of the electronic device 2000.

According to an embodiment, the second state of the electronic device 2000 may be defined as a state in which the second housing 2020 is moved in the first direction (e.g., an extended state or a slide-out state). For example, in the second state of the electronic device 2000, the second housing 2020 may be movable in the second direction, but it may not be movable in the first direction. In the second state of the electronic device 2000, the distance between the side surface 2020*a* of the second housing 2020 and the first housing 2010 may decrease as the second housing 2020 moves, but it may not increase. As another example, in the second state of the electronic device 2000, a portion of the second housing 2020 may be insertable into the first housing 2010, but it may not be extractable from the first housing 2010. According to an embodiment, the second state of the electronic device 2000 may be defined as a state in which the second area 2030*b* of the display 2030 is visually exposed from the outside of the electronic device 2000. For example, in the second state of the electronic device 2000, the second area 2030*b* of the display 2030 may be pulled-out from the internal space of the electronic device 2000 so that it is visible from the outside of the electronic device 2000.

According to an embodiment, when the second housing 2020 moves from the first housing 2010 in the first direction (e.g., +y direction), at least a portion of the second housing 2020 and/or the second area 2030*b* of the display 2030 may be pulled-out from the first housing 2010 by a pull-out length 'd1' corresponding to a travelling distance of the second housing 2020. According to an embodiment, the second housing 2020 may reciprocate within a designated distance 'd2'. According to an embodiment, the pull-out length 'd1' may have a size of approximately 0 to the designated distance 'd2'.

According to an embodiment, the state of the electronic device 2000 may be convertible between the second state and/or the first state, with either a manual operation by a user or an automatic operation by a driving module (not shown) disposed inside the first housing 2010 or the second housing 2020. According to an embodiment, an operation of the driving module may be triggered based on a user input. According to an embodiment, the user input for triggering the operation of the driving module may include a touch input, a force touch input, and/or a gesture input via the display 2030. According to another embodiment, the user input for triggering the operation of the driving module may include a voice input or an input of a physical button exposed to the outside of the first housing 2010 or the second housing 2020. According to an embodiment, the driving module may be driven in a semi-automatic manner in which an operation is triggered when a manual operation by a user's external force is detected.

According to an embodiment, a first state of the electronic device 2000 may be referred to as a first shape, and a second state of the electronic device 2000 may be referred to as a second shape. For example, the first shape may include a normal state, a reduced state, or a closed state, and the second shape may include an open state. According to an embodiment, the electronic device 2000 may form a third state (e.g., an intermediate state) between the first state and the second state. For example, the third state may be referred to as a third shape, and the third shape may include a free stop state.

According to an embodiment, the display 2030 may be visible or viewable from the outside through a front direction (e.g., −z direction) of the electronic device 2000, so as to display visual information to the user. For example, the display 2030 may include a flexible display. According to an embodiment, the display 2030 may disposed in the second housing 2020 and may by pulled-out from an internal space (not shown) of the electronic device 2000 or pulled-in into the internal space of the electronic device 2000, according to the movement of the second housing 2020. The internal space of the electronic device 2000 may refer to an internal space inside the first housing 2010 and the second housing 2020 formed by coupling of the first housing 2010 and the second housing 2020. For example, in the first state of the electronic device 2000, at least a portion of the display 2030 may be slidably rolled into the internal space of the electronic device 2000. When the second housing 2020 moves in the first direction in a state that at least a portion of the display 2030 is inserted into the internal space of the electronic device 2000, the at least a portion of the display 2030 may be pulled out from the internal space of the electronic device 2000. As another example, when the second housing 2020 moves in the second direction, at least a portion of the display 2030 is rolled into the inside of the electronic device 2000 so as to inserted into the internal space of the electronic device 2000. As the at least a portion of the display 2030 is pulled-out or pulled-in, the area of the display 2030 that is visible from the outside of the electronic device 2000 may be expanded or reduced. According to an embodiment, the display 2030 may include a first area 2030a and a second area 2030b.

According to an embodiment, the first area 2030a of the display 2030 may refer to an area of the display 2030 that is viewable from the outside of the electronic device 2000, regardless of whether the electronic device 2000 is in the second state or the first state. For example, the first area 2030a may refer to a partial area of the display 2030 that is not rolled into the internal space of the electronic device 2000. According to an embodiment, when the second housing 2020 moves, the first area 2030a may move together with the second housing 2020. For example, when the second housing 2020 moves along the first direction or in the second direction, the first area 2030a may move along the first direction or in the second direction on the front surface of the electronic device 2000 together with the second housing 2020.

According to an embodiment, a second area 2030b of the display 2030 may be connected to the first area 2030a, and as the second housing 2020 moves, it may be inserted into the internal space of the electronic device 2000 or may be drawn out from the internal space of the electronic device 2000. For example, in the first state of the electronic device 2000, the second area 2030b of the display 2030 may be in a rolled up state, being inserted into the internal space of the electronic device 2000. In the first state of the electronic device 2000, the second area 2030b of the display 2030 may not be visible from the outside as it is inserted into the internal space of the electronic device 2000. As another example, in the second state of the electronic device 2000, the second area 2030b of the display 2030 may be in a state pulled-out from the internal space of the electronic device 2000. The second area 2030b of the display 2030 may be visible from the outside of the electronic device 2000, in the second state.

According to an embodiment, in the first state of the electronic device 2000, the area of the display 2030 visible from the outside of the electronic device 2000 may include only the first area 2030a of the display 2030. In the second state of the electronic device 2000, the area of the display 2030 visible from the outside of the electronic device 2000 may include the first area 2030a and at least a portion of the second area 2030b of the display 2030.

According to an embodiment, the first housing 2010 of the electronic device 2000 may include a book cover 2011 surrounding the inner space of the first housing 2010 and a back plate 2012 covering up a rear surface of the book cover 2011. The second housing 2020 of the electronic device 2000 may include a front cover 2021 surrounding the inner space of the electronic device 2000.

According to an embodiment, the front cover 2021 may include a first cover area 2021a of the front cover 2021 that is not inserted into the first housing 2010, and a second cover area 2021b that is inserted or drawn out into/from the first housing 2010. The first cover area 2021a of the front cover 2021 may always be visible from the outside regardless of whether the electronic device 2000 is in the second state or in the first state. According to an embodiment, at least a portion of the first cover area 2021a of the front cover 2021 may form a side surface 2020a of the second housing 2020. According to an embodiment, the second cover area 2021b of the second housing 2020 may not be visible in the first state, but may be visible in the second state.

A camera 2040 may acquire an image of a subject based on receiving light from the outside of the electronic device 2000. According to an embodiment, the camera 2040 may include one or more lenses, an image sensor, and/or an image signal processor. According to an embodiment, the camera 2040 may be disposed on the second housing 2020 so as to face the rear surface of the electronic device 2000 opposite to the front surface of the electronic device 2000 on which the first area 2030a of the display 2030 is disposed. For example, the camera 2040 may be disposed on the front cover 2021 of the second housing 2020 and may be visible from the outside of the electronic device 2000 through an opening 2011a formed in the book cover 2011, when the electronic device 2000 is in the first state. For another example, the camera 2040 may be disposed on the front cover 2021 of the second housing 2020, and when the electronic device 2000 is in the first state, it may not be visible from the outside of the electronic device 2000 because it is covered with the book cover 2011 and/or the rear plate 2012.

According to an embodiment, the camera 2040 may include a plurality of cameras. For example, the camera 2040 may include a wide-angle camera, an ultra-wide-angle camera, a telephoto camera, a close-up camera, and/or a depth camera. However, the camera 2040 is not necessarily limited to including a plurality of cameras, and may include only one camera.

According to an embodiment, the camera 2040 may further include a camera (not shown) that is directed to the front surface of the electronic device 2000 in which the first area 2030a of the display 2030 is disposed. When the camera 2040 is directed to the front surface of the electronic device 2000, the camera 2040 may include an under display camera (UDC) disposed below the display 2030 (e.g., in +z direction from the display 2030), but the disclosure is not limited thereto.

According to an embodiment, the electronic device 2000 may include a sensor module (not shown) and/or a camera module (not shown) disposed underneath the display 2030. The sensor module may detect an external environment based on information (e.g., light) received passing through the display 2030. According to an embodiment, the sensor module may include, for example, at least one of a receiver, a proximity sensor, an ultrasonic sensor, a gesture sensor, a gyro sensor, a barometric pressure sensor, a magnetic sensor, an acceleration sensor, a grip sensor, a color sensor, an IR (infrared) sensor, a biometric sensor, a temperature sensor, a humidity sensor, a motor encoder, or an indicator. According to an embodiment, at least some sensor modules of the electronic device 2000 may be visually exposed to the outside through a partial area of the display 2030. According to an embodiment, the electronic device 2000 may detect a pull-out length (e.g., a pull-out length d1) using a sensor module. According to an embodiment, the electronic device 2000 may generate pull-out information on a degree of pulling-out detected by the sensor. For example, the electronic device 2000 may detect and/or identify the degree of pulling-out of the second housing 2020, using the pull-out information. According to an embodiment, the pull-out information may include information about a pull-out length of the second housing 2020.

According to an embodiment, a shape of coupling of the first housing 2010 and the second housing 2020 is not limited to the shapes of coupling shown in FIGS. 20A, 20B, 20C and 20D, and may be implemented by a combination and/or coupling of other shape or parts.

FIG. 21A is an exploded perspective view of an electronic device according to an embodiment. And FIG. 21B is a cross-sectional view illustrating an example of an electronic device according to an embodiment taken along a line A-A' of FIG. 20A.

Referring to FIGS. 21A and 21B, the electronic device 2000 according to an embodiment may include a first housing 2010, a second housing 2020, a display 2030, a camera 2040, a battery 2050, and a driving unit 2060. According to an embodiment, the first housing 2010 and the second housing 2020 may be coupled to each other to form an internal space 2001 of the electronic device 2000. For example, in the first state of the electronic device 2000, the second area 2030b of the display 2030 may be accommodated in the internal space 2001.

According to an embodiment, the first housing 2010 may include a book cover 2011, a rear plate 2012, and a frame cover 2013. According to an embodiment, the book cover 2011, the rear plate 2012, and the frame cover 2013 included in the first housing 2010 may be coupled to each other, so that they may not move when the second housing 2020 moves with respect to the first housing 2010. According to an embodiment, the book cover 2011 may form at least a portion of an outer surface of the electronic device 2000. For example, the book cover 2011 may form at least a portion of a side surface of the electronic device 2000 and may form at least a portion of the rear surface of the electronic device 2000. According to an embodiment, the book cover 2011 may provide a surface on which the rear plate 2012 is seated. The back plate 2012 may be seated on one surface of the book cover 2011.

According to an embodiment, the frame cover 2013 may support internal components of the electronic device 2000. For example, the frame cover 2013 may accommodate at least a portion of the battery 2050 and the driving unit 2060. The battery 2050 and the driving unit 2060 may be accommodated in at least one of a recess or a hole included in the frame cover 2013. According to an embodiment, the frame cover 2013 may be surrounded by the book cover 2011. For example, in the first state of the electronic device 2000, one surface 2013a of the frame cover 2013 on which the battery 2050 is disposed may face the book cover 2011 and/or at least a portion of the second surface 2030b of the display 2030. As another example, in the first state of the electronic device 2000, the other surface 2013b of the frame cover 2013 facing the one surface 2013a of the frame cover 2013 may face the first area 2030a of the display 2030 or the front cover 2021. For example, the frame cover 2013 may include an aluminum material, but it is not limited thereto.

According to an embodiment, the second housing 2020 may include a front cover 2021, a rear cover 2022, and a slide cover 2023. According to an embodiment, the front cover 2021, the rear cover 2022, and the slide cover 2023 may be coupled to each other, and as the second housing 2020 moves relative to the first housing 2010, they may move together with the second housing 2020. The front cover 2021 may support internal components of the electronic device 2000. For example, a printed circuit board 2024 on which the electronic components of the electronic device 2000 (e.g., the processor 120 of FIG. 1) are disposed, and/or the camera 2040 may be on one surface 2021c of the front cover 2021 facing the internal space 2001. When the electronic device 2000 is in the first state, the other surface 2021d of the front cover 2021 facing the one surface 2021c of the front cover 2021 may face the first area 2030a of the display 2030. According to an embodiment, the rear cover 2022 may be coupled to the front cover 2021 to protect components of the electronic device 2000 disposed on the front cover 2021. For example, the rear cover 2022 may cover some of one surface 2021c of the front cover 2021. According to an embodiment, the slide cover 2023 may be disposed on the rear cover 2022 (e.g., in +z direction) to form an external surface of the electronic device 2000 together with the rear plate 2012 and the book cover 2011. The slide cover 2023 may be coupled to one surface of the rear cover 2022 to protect the rear cover 2022 and/or the front cover 2021.

According to an embodiment, when the electronic device 2000 is in the first state, at least a part of the display 2030 may be rolled into the internal space 2001, thereby being bent. According to an embodiment, the display 2030 may cover at least a portion of the frame cover 2013 and at least a portion of the front cover 2021. For example, when the electronic device 2000 is in the first state, the display 2030 may cover the other surface 2021d of the front cover 2021 and pass through between the front cover 2021 and the book cover 2011 to extend toward the internal space 2001. The display 2030 may pass between the front cover 2021 and the book cover 2011 and then surround the frame cover 2013. The display 2030 may cover one surface 2013a of the frame cover 2013 in the inner space 2001. According to an embodiment, when the second housing 2020 moves in the first direction, the second area 2030b of the display 2030 may be pulled out from the internal space 2001. For example, as the second housing 2020 moves in the second direction, the display 2030 may pass through between the front cover 2021 and the book cover 2011 and may be pulled out from the internal space 2001.

According to an embodiment, the electronic device 2000 may include a support bar 2031 supporting the display 2030 and a guide rail 2032. For example, the support bar 2031 may include a plurality of bars coupled to each other, and may be manufactured in a shape corresponding to the shape of the second area 2030b of the display 2030. According to an embodiment, the support bar 2031 may move together with the display 2030 as the display 2030 moves. According to an embodiment, in a first state in which the second area 2030b of the display 2030 is rolled up inside the internal space 2001, the support bar 2031 may be rolled up in the inner space 2001 together with the second area 2030b of the display 2030. The support bar 2031 may move together with the second area 2030b of the display 2030 as the second housing 2020 moves in the first direction. According to an embodiment, the guide rail 2032 may guide the movement of the support bar 2031. For example, as the display 2030 moves, the support bar 2031 may move along the guide rail 2032 coupled to the frame cover 2013. According to an embodiment, the guide rail 2032 may be coupled to the frame cover 2013. For example, the guide rail 2032 may include a plurality of guide rails 2032 that are spaced apart from each other on both edges of the frame cover 2013 spaced apart from each other along a third direction (e.g., +x direction) substantially perpendicular to the first direction (e.g., +y direction).

According to an embodiment, the driving unit 2060 may provide a driving force to the second housing 2020 so that the second housing 2020 can move relative to the first housing 2010. According to an embodiment, the driving unit 2060 may include a motor 2061, a pinion gear 2062, and a rack gear 2063. The motor 2061 may receive power from the battery 2050 to provide driving force to the second housing 2020. According to an embodiment, the motor 2061 may be disposed in the first housing 2010 and may not move as the second housing 2020 moves with respect to the first housing 2010. For example, the motor 2061 may be disposed in a recess formed in the frame cover 2013. According to an embodiment, the pinion gear 2062 may be coupled to the motor 2061 to rotate by a driving force supplied from the motor 2061. According to an embodiment, the rack gear 2063 may be meshed with the pinion gear 2062, and may move according to the rotation of the pinion gear 2062. For example, the rack gear 2063 may linearly reciprocate in the first direction or the second direction according to the rotation of the pinion gear 2062. According to an embodiment, the rack gear 2063 may be disposed in the second housing 2020. For example, the rack gear 2063 may be coupled to the front cover 2021 included in the second housing 2020. According to an embodiment, the rack gear 2063 may be movable within a working space 2013*p* formed in the frame cover 2013.

According to an embodiment, when the pinion gear 2062 rotates along a first rotational direction (e.g., clockwise in FIG. 21B), the rack gear 2063 may move in the first direction (e.g., +y direction). When the rack gear 2063 moves along the first direction, the second housing 2020 coupled to the rack gear 2063 may move along the first direction. As the second housing 2020 moves along the first direction, the area of the display 2030 visible from the outside of the electronic device 2000 may be expanded. When the pinion gear 2062 rotates in a second rotational direction (e.g., counterclockwise in FIG. 21B), the rack gear 2063 may move in the second direction (e.g., −y direction). When the rack gear 2063 moves in the second direction, the second housing 2020 coupled to the rack gear 2063 may move in the second direction. As the second housing 2020 moves along the second direction, the area of the display 2030 visible from the outside of the electronic device 2000 may be reduced.

In the foregoing description, it has been described that the motor 2061 and the pinion gear 2062 are disposed in the first housing 2010, and the rack gear 2063 is disposed in the second housing 2020, but various embodiments may not be limited thereto. According to various embodiments, the motor 2061 and the pinion gear 2062 may be disposed in the second housing 2020, and the rack gear 2063 may be disposed in the first housing 2010.

An electronic device, a method, and a non-transitory computer-readable storage medium according to an embodiment can display a window for guiding a change of a screen according to a change in size of a display region, thereby providing enhanced user experience (UX).

As described above, according to an embodiment, an electronic device may comprise a housing, a flexible display that is (or configured to be) slidable-in into the housing or slidable-out from the housing, a memory configured to store instructions, and a processor operatively coupled to the flexible display. The processor may be configured to, when the instructions are executed, receive a predetermined input, while a first portion of a screen is displayed in a state in which a display region of the flexible display exposed out of the housing has a first size. The processor may be configured to, when the instructions are executed, in response to the predetermined input, display a window for guiding a position where a second portion of the screen extended from the first portion of the screen is to be displayed, when a size of the display region is changed from the first size to a second size larger than the first size, as partially superimposed on the first portion of the screen. Additionally or alternatively, the processor may be, when the instructions are executed, configured to receive a predetermined input, while a screen is displayed in a state that a display region of the flexible display exposed out of the housing has a first size, and in response to the predetermined input, display a window for guiding a portion of the screen, of which display is to be ceased when a size of the display region is changed from the first size to a second size smaller than the first size, as superimposed on the portion of the screen.

According to an embodiment, the window may be superimposed on an area within the first portion of the screen from an edge of the first portion of the screen, from which edge the second portion of the screen is extended, up to a first distance from the edge. Additionally or alternatively, a size of the window may correspond to a difference between the first size and the second size. This position of the window intuitively indicates the user about which direction the display region is to be changed and thus, enhances user experience.

According to an embodiment, the first distance may correspond to a difference between the first size and the second size. Accordingly, the window intuitively indicates the user about the size of the change of the display region and thus, enhances user experience even further.

According to an embodiment, the window may be translucent so that the area in the first portion of the screen is visible. Additionally or alternatively, the window may be translucent so that the portion of the screen is visible. Advantageously, the content affected by the change of the display region will be visible to the user and thus, the user experience is further enhanced.

According to an embodiment, the window may include a visual object for indicating a direction the second portion of the screen extends from the first portion of the screen. Additionally or alternatively, the window may include a visual object for indicating a direction in which the portion of the screen disappears while the size of the display region is changed from the first size to the second size and/or a visual object for indicating a positional relationship between the portion of the screen and a remaining portion of the screen. The visual object intuitively indicates the user about which direction the display region is to be changed and thus, enhances user experience.

According to an embodiment, the processor may be configured to, when the instructions are executed, receive a user input for changing the size of the display region from the first size to the second size, while the window is displayed. According to an embodiment, the processor may be configured to, when the instructions are executed, in response to the user input, display, in the display region having the second size changed from the first size, the first portion of the screen and the second portion of the screen extending from the first portion of the screen. Additionally or alternatively, the processor may be configured to, when the instructions are executed, in response to the user input, display a remaining portion of the screen in the display region having the second size changed from the first size, and cease displaying the portion of the screen.

According to an embodiment, the electronic device may further include a physical button exposed through a part of the housing. According to an embodiment, the predetermined input may be an input of pressing the physical button so that one end of the physical button is moved by a distance between a first reference distance and a second reference distance. According to an embodiment, the user input may be an input of pressing the physical button so that the one end of the physical button is moved by the second reference distance. Physical buttons may be intuitively used by users and thus, the user experience may be further enhanced.

According to an embodiment, the predetermined input may be a hovering input maintained for a predetermined time in a state spaced apart from the display region having the first size by a distance less than a threshold distance. According to an embodiment, the user input may be an input of pressing a physical button exposed through a part of the housing. Hovering inputs and physical buttons may be intuitively used by users and thus, the user experience may be further enhanced.

According to an embodiment, the second portion of the screen may extend from a first edge of the first portion of the screen. According to an embodiment, the processor may be further configured to, when the instructions are executed, based on identifying that a third portion of the screen extending from a second edge of the first portion of the screen, parallel to the first edge of the first portion of the screen, is not displayed within the display region having the first size, display another window for guiding a position in which the third portion of the screen is to be displayed when the size of the display region is changed to the second size, as partially superimposed on the first portion of the screen. According to an embodiment, the window may be superimposed on a first area of the first portion of the screen including the first edge. According to an embodiment, the other window may be superimposed on a second area of the first portion of the screen, the second area including the second edge and spaced apart from the first area of the first portion of the screen. The use of two windows in different positions allows the user to intuitively select in which direction the display region is to be changed and thus, enhances user experience.

According to an embodiment, the processor may be further configured to, when the instructions are executed, receive a user input for selecting the other window of the window and the other window while the window visually highlighted with respect to the other window is displayed. According to an embodiment, the processor may be further configured to, when the instructions are executed, display the other window visually highlighted with respect to the window, in response to the user input. Highlighting one of the windows further enhances user experience.

According to an embodiment, the processor may be further configured to, when the instructions are executed, based on a user input for changing the size from the first size to the second size, received while the window visually highlighted with respect to the other window is displayed, display the first portion of the screen and the second portion of the screen extended from the first edge of the first portion of the screen, in the display region having the second size changed from the first size. According to an embodiment, the processor may be further configured to, when the instructions are executed, based on a user input for changing the size from the first size to the second size, received while the other window visually highlighted with respect to the window is displayed, display the first portion of the screen and a third portion of the screen extended from the second edge of the first portion of the screen, in the display region having the second size changed from the first size.

According to an embodiment, the user input for selecting the other window of the window and the other window may be a touch input that is received while the window visually highlighted with respect to the other window is displayed, and released after a contact point on the display region is moved in a first direction the third portion of the screen is extended from the first portion of the screen or in a second direction opposite to the first direction. The user input for selecting the other window of the window and the other window may be a touch input that is received while the window visually highlighted with respect to the other window is displayed, and released after a contact point on the display region is moved in a first direction (or in a second direction opposite to the first direction), e.g. such that the third portion of the screen is extended from the first portion of the screen, Advantageously, the change of the display region may be operated easily and, thus, the user experience may be enhanced.

According to an embodiment, the electronic device may further include a physical button exposed through a part of the housing. According to an embodiment, the user input for selecting the other window of the window and the other window may be an input that is received while the window visually highlighted with respect to the other window is displayed, and released after a contact point on the physical button is moved in a first direction the third portion of the screen is extended from the first portion of the screen or in a second direction opposite to the first direction. The user input for selecting the other window of the window and the other window may be an input that is received while the window visually highlighted with respect to the other window is displayed, and released after a contact point on the physical button is moved in a first direction (or in a second direction opposite to the first direction), e.g. such that the third portion of the screen is extended from the first portion of the screen or in a second direction opposite to the first direction. Advantageously, the change of the display region may be operated easily and, thus, the user experience may be enhanced.

According to an embodiment, the processor may be further configured to, when the instructions are executed, in response to a predetermined input received while the first portion of the screen and the second portion of the screen are displayed in a state that the display region of the flexile display exposed out of the housing has the second size, display another window for guiding the second portion of the screen, of which display is to be ceased when the size of the display region is changed from the second size to the first size, as superimposed on the second portion of the screen.

As described above, according to an embodiment, an electronic device may comprise a housing, a flexible display that is slidable-in into the housing or slidable-out from the housing, a memory configured to store instructions, and a processor operatively coupled to the flexible display. The processor may be configured to, when the instructions are executed, receive a predetermined input, while a screen is displayed in a state that a display region of the flexible display exposed out of the housing has a first size. The processor may be configured to, when the instructions are executed, in response to the predetermined input, display a window for guiding a portion of the screen of which display is to be ceased when a size of the display region is changed from the first size to a second size smaller than the first size, as superimposed on the portion of the screen.

According to an embodiment, a size of the window may correspond to a difference between the first size and the second size.

According to an embodiment, the window may be translucent so that the portion of the screen is visible.

According to an embodiment, the window may include a visual object for indicating a positional relationship between the portion of the screen and the remaining portion of the screen.

According to an embodiment, the visual object may further indicate a direction in which the portion of the screen disappears while the size of the display region is changed from the first size to the second size.

According to an embodiment, the processor may be further configured to, when the instructions are executed, receive a user input for changing the size of the display region from the first size to the second size while the window is displayed. According to an embodiment, the processor may be further configured to, when the instructions are executed, in response to the user input, display a remaining portion of the screen in the display region having the second size changed from the first size, and cease displaying the portion of the screen.

According to an embodiment, the electronic device may further include a physical button exposed through a part of the housing. According to an embodiment, the predetermined input may be an input of pressing the physical button so that one end of the physical button is moved by a distance between a first reference distance and a second reference distance. According to an embodiment, the user input may be an input of pressing the physical button so that the one end of the physical button is moved by the second reference distance.

According to an embodiment, the predetermined input may be a hovering input maintained for a predetermined time in a state spaced apart from the display region having the first size by a distance less than a threshold distance. According to an embodiment, the user input may be an input of pressing a physical button exposed through a part of the housing.

According to an embodiment, the processor may be further configured to, when the instructions are executed, receive a user input for changing a position of the window while the window superimposed on the portion of the screen is displayed. According to an embodiment, the processor may be configured to, when the instructions are executed, by moving the window in response to the user input, display the window for guiding another portion of the screen of which display is to be ceased when the size of the display region is changed from the first size to the second size, as superimposed on the other portion of the screen.

According to an embodiment, the processor may be further configured to, when the instructions are executed, based on a user input for changing the size of the display region from the first size to the second size, received while the window is displayed, being superimposed on the portion of the screen, display a first portion of the screen that is distinguished from the portion of the screen, in the display region having the second size changed from the first size, and cease displaying the portion of the screen. According to an embodiment, the processor may be further configured to, when the instructions are executed, based on a user input for changing the size of the display region from the first size to the second size, received while the window is displayed, being superimposed on the other portion of the screen, display a second portion of the screen that is distinguished from the other portion of the screen, in the display region having the second size changed from the first size, and cease displaying the other portion of the screen.

According to an embodiment, the user input may be a touch input that is released after a contact point on the window superimposed on the portion of the screen is moved in a direction from the portion of the screen to the other portion of the screen.

According to an embodiment, the electronic device may further include a physical button exposed through a part of the housing. According to an embodiment, the user input may be an input that is received while the window superimposed on the portion of the screen is displayed, and released after a contact point on the physical button is moved in a direction from the portion of the screen to the other portion of the screen.

According to an embodiment, the processor may be further configured to, when the instructions are executed, receive a user input for changing the size of the window while the window superimposed on the portion of the screen is displayed. According to an embodiment, the processor may be further configured to, when the instructions are executed, identify the second size, based on the changed size of the window, in response to the user input. According to an embodiment, may be further configured to, when the instructions are executed, based on the identifying, cease displaying the first portion of the screen located below the window having the changed size, and display a remaining portion of the screen that is distinguished from the first portion of the screen, in the display region having the identified second size.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, a method for operating an electronic device, in particular the above-mentioned electronic device, comprising a housing and a flexible display that is slidable-in into the housing or slidable-out from the housing. According to one step of the method, a predetermined input may be received, while a first portion of a screen is displayed in a state in which a display region of the flexible display exposed out of the housing has a first size. According to another step, in response to the predetermined input, a window for guiding a position where a second portion of the screen extended from the first portion of the screen is to be displayed may be displayed, when a size of the display region is changed from the first size to a second size larger than the first size, partially overlappingly on the first portion of the screen.

Additionally or alternatively, the method may comprise the steps of receiving a predetermined input, while a screen is displayed in a state that a display region of the flexible display exposed out of the housing has a first size and in response to the predetermined input, displaying a window for guiding a portion of the screen of which display is to be ceased when a size of the display region is changed from the first size to a second size smaller than the first size, as superimposed on the portion of the screen. Advantages and technical effects obtained by optional features of the above-mentioned electronic device may be analogously obtained with the method. That is, the optional features of the above-mentioned electronic device may be analogously applied with the method.

It should be appreciated that various embodiments of the disclosure and the terms used therein are not intended to limit the technological features set forth herein to particular embodiments and include various changes, equivalents, or replacements for a corresponding embodiment of the disclosure. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1540) including one or more instructions that are stored in a storage medium (e.g., an internal memory 1536 or an external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a housing including a first housing part and a second housing part configured to movably engage with the first housing part between a retracted state of the housing and an extended state of the housing;
    a flexible display coupled to the first housing part and the second housing part such that a size of an area of the flexible display that is visible from a front side of the housing changes as a state of the housing is changed between the retracted state and the extended state;
    memory, storing instructions, comprising one or more storage media; and
    at least one processor comprising processing circuitry,
    wherein the instructions, when executed by the at least one processor individually or collectively, cause the electronic device to:
        receive a defined input, while a first portion of a screen is displayed via the area of the flexible display in the retracted state, and
        in response to the defined input, display a window for guiding a position where a second portion of the screen is to be displayed when the state of the housing is changed from the retracted state to the extended state, as partially superimposed on the first portion of the screen.

2. The electronic device of claim 1, wherein the window is superimposed on a partial region of the first portion of the screen, and
    wherein the partial region of the first portion of the screen is adjacent to the second portion of the screen.

3. The electronic device of claim 2, wherein a size of the partial region corresponds to a difference between a first size of the area of the flexible display when the housing is in the retracted state and a second size of the area of the flexible display when the housing is in the extended state.

4. The electronic device of claim 2, wherein the window is translucent for allowing a user to view the partial region of the first portion of the screen through the window.

5. The electronic device of claim 1, wherein the window includes a visual object for indicating a direction the second portion of the screen is extended from the first portion of the screen.

6. The electronic device of claim 1, wherein the instructions, when executed by the at least one processor individually or collectively, further cause the electronic device to:
    receive a user input for changing the state of the housing from the retracted state to the extended state, while the window is displayed; and
    in response to the user input:
        change the state of the housing from the retracted state to the extended state, and display the first portion of the screen and the second portion of the screen extending from the first portion of the screen, via the area of the flexible display in the extended state.

7. The electronic device of claim 6, further comprising:
a physical button exposed through a part of the housing,
wherein the defined input is an input of pressing the physical button so that one end of the physical button is moved by a distance between a first reference distance and a second reference distance while the housing is in the retracted state, and
wherein the user input is an input of pressing the physical button so that the one end of the physical button is moved by the second reference distance while the housing is in the retracted state.

8. The electronic device of claim 6,
wherein the defined input is a hovering input maintained for a defined time in a state spaced apart from the area of the flexible display by a distance less than a threshold distance, while the housing is in the retracted state, and
wherein the user input is an input of pressing a physical button exposed through a part of the housing while the housing is in the retracted state.

9. The electronic device of claim 1,
wherein the window is a first window,
wherein the second portion of the screen extends from a first edge of the first portion of the screen,
wherein the instructions, when executed by the at least one processor individually or collectively, further cause the electronic device to:
while the housing is in the retracted state, identifying that a third portion of the screen extending from a second edge of the first portion of the screen, opposite to the first edge of the first portion of the screen, is not displayed via the area of the flexible display,
based on identifying that the third portion of the screen is not displayed via the area of the flexible display, display a second window for guiding a position in which the third portion of the screen is to be displayed when the state of the housing is changed from the retracted state to the extended state, as partially superimposed on the first portion of the screen,
wherein the first window is superimposed on a first region of the first portion of the screen including the first edge, and
wherein the second window is superimposed on a second region of the first portion of the screen, the second region including the second edge and spaced apart from the first region of the first portion of the screen.

10. The electronic device of claim 9, wherein the instructions, when executed by the at least one processor individually or collectively, further cause the electronic device to:
receive a user input for selecting the second window of the first window and the second window, while the first window visually highlighted with respect to the second window is displayed; and
display the second window visually highlighted with respect to the first window, in response to the user input.

11. The electronic device of claim 10, wherein the instructions, when executed by the at least one processor individually or collectively, further cause the electronic device to:
based on a user input for changing the state of the housing from the retracted state to the extended state, being received while the first window visually highlighted with respect to the second window is displayed, display the first portion of the screen and the second portion of the screen extended from the first edge of the first portion of the screen, via the area of the flexible display in the extended state; and
based on a user input for changing the state of the housing from the retracted state to the extended state being received while the second window visually highlighted with respect to the first window is displayed, display the first portion of the screen and the third portion of the screen extended from the second edge of the first portion of the screen, via the area of the flexible display in the extended state.

12. The electronic device of claim 10, wherein the user input for selecting the second window of the first window and the second window is a touch input that is:
received while the first window visually highlighted with respect to the second window is displayed, and
released after a contact point on the area of the flexible display is moved in a first direction the third portion of the screen is extended from the first portion of the screen or in a second direction opposite to the first direction.

13. The electronic device of claim 10, further comprising:
a physical button exposed through a part of the housing,
wherein the user input for selecting the second window of the first window and the second window is an input that is:
received, while the first window visually highlighted with respect to the second window is displayed, and
released after a contact point on the physical button is moved in a first direction or in a second direction opposite to the first direction such that the third portion of the screen is extended from the first portion of the screen.

14. The electronic device of claim 1, wherein the instructions, when executed by the at least one processor individually or collectively, further cause the electronic device to:
in response to a defined input received while the first portion of the screen and the second portion of the screen are displayed via the area of the flexible display in the extended state, display another window for guiding the second portion of the screen, of which displaying is to be ceased when the state of the housing is changed from the extended state to the retracted state, as superimposed on the second portion of the screen.

15. An electronic device comprising:
a housing including a first housing part and a second housing part configured to movably engage with the first housing part between a retracted state of the housing and an extended state of the housing;
a flexible display coupled to the first housing part and the second housing part such that a size of an area of the flexible display that is visible from a front side of the housing changes as a state of the housing is changed between the retracted state and the extended state;
at least one processor comprising processing circuitry; and
memory, storing instructions, comprising one or more storage media,
wherein the instructions, when executed by the at least one processor individually or collectively, cause the electronic device to:
receive a defined input, while a screen is displayed via the area of the flexible display in the extended state, and
in response to the defined input, display a window for guiding a portion of the screen, of which displaying is to be ceased when the state of the housing is changed from the extended state the retracted state, as superimposed on the portion of the screen.

16. The electronic device of claim 15, wherein a size of the window corresponds to a difference between a first size of the area of the flexible display when the housing is in the retracted state and a second size of the area of the flexible display when the housing is in the extended state.

17. The electronic device of claim 15, wherein the window is translucent for allowing a user to view the partial region of the first portion of the screen through the window.

18. The electronic device of claim 17, wherein the visual object further indicates a direction in which the portion of the screen disappears while the state of the housing is changed from the extended state to the retracted state.

19. The electronic device of claim 15, wherein the window includes a visual object for indicating a positional relationship between the portion of the screen and a remaining portion of the screen.

20. The electronic device of claim 15, wherein the instructions, when executed by the at least one processor individually or collectively, further cause the electronic device to:
  receive a user input for changing the state of the housing from the extended state to the retracted state while the window is displayed; and
  in response to the user input:
    change the state of the housing from the extended state to the retracted state,
    display a remaining portion of the screen via the area of the flexible display in the retracted state, and
    cease displaying the portion of the screen in the retracted state.

* * * * *